United States Patent [19]
Price

[11] 3,839,829
[45] Oct. 8, 1974

[54] MACHINE TOOL FAULT INDICATOR

[75] Inventor: Ralph E. Price, Waynesboro, Pa.

[73] Assignee: Landis Tool Company, Waynesboro, Pa.

[22] Filed: July 26, 1973

[21] Appl. No.: 382,695

[52] U.S. Cl......... 51/105 SP, 51/165.74, 51/165.91
[51] Int. Cl............................................. B24b 5/42
[58] Field of Search......... 51/105 R, 105 SP, 165 R, 51/165.74, 165.91, 165.8

[56] References Cited
UNITED STATES PATENTS

| | | | |
|---|---|---|---|
| 2,780,895 | 2/1957 | Siluen | 51/165.91 X |
| 3,118,258 | 1/1964 | Price | 51/165.91 X |
| 3,716,949 | 2/1973 | Price | 51/165.8 |

*Primary Examiner*—Harold D. Whitehead
*Attorney, Agent, or Firm*—Joseph R. Spalla; Spencer T. Smith

[57] ABSTRACT

The crankpins of a crankshaft mounted in a workpiece carriage are successively ground to a desired size by a sequence of movements of a grinding wheel moved under the control of a control circuit. The crankshaft is mounted in clamping mechanisms latched closed and rotatably driven by associated headstocks. During the grinding operation, each crankpin to be ground is axially positioned by an axial locator mechanism mounted on a positioner mechanism which is moved between rest and operating positions, and the final grinding of each crankpin is effected while a retractable work rest mounted on the positioner is pressed against the crankpin. After each pin is ground, the workpiece carriage is traversed and the crankshaft is rotated to position the next crankpin for grinding, and when the final crankpin has been ground the machine returns to an initial position where the clamps are unlatched and opened to enable the ground crankshaft to be replaced by another workpiece. The movements of the various mechanisms of the machine are detected by the operation of limit switches and other switches interfacing with a sequence controller which produces signals continuing the operation of the machine. To facilitate the detection and correction of a fault condition disabling the automatic operation of the machine, a fault detector arrangement is provided which senses an incorrect inital condition by the absence of the operation of one of the limit switches and provides a visible indication of the fault by energizing a light associated with the particular fault. In addition, the fault detection arrangement disables the further operation of the machine in the automatic mode until the specific fault is corrected and the machine placed in a proper initial condition for automatic operation. The operation of the various mechanisms of the grinding machine occur in a predetermined sequence in which the signals provided by the limit switches must occur in proper sequential relationship. The movements of the mechanisms of the machine are divided into events which are clocked by a timer, and the occurrence of a sequential fault will be indicated by the energization of the general fault light and the disablement of the machine from further operation in the automatic mode as well as by the energization of a light associated with the particular sequential fault. Upon correction of the particular fault as determined by the manual operation of the switches associated with the indicated sequence fault, the machine may be returned to the automatic operation by first returning it to the proper initial condition under the control of separately energized push buttons associated with a manual mode of operation.

7 Claims, 14 Drawing Figures

Fig_1

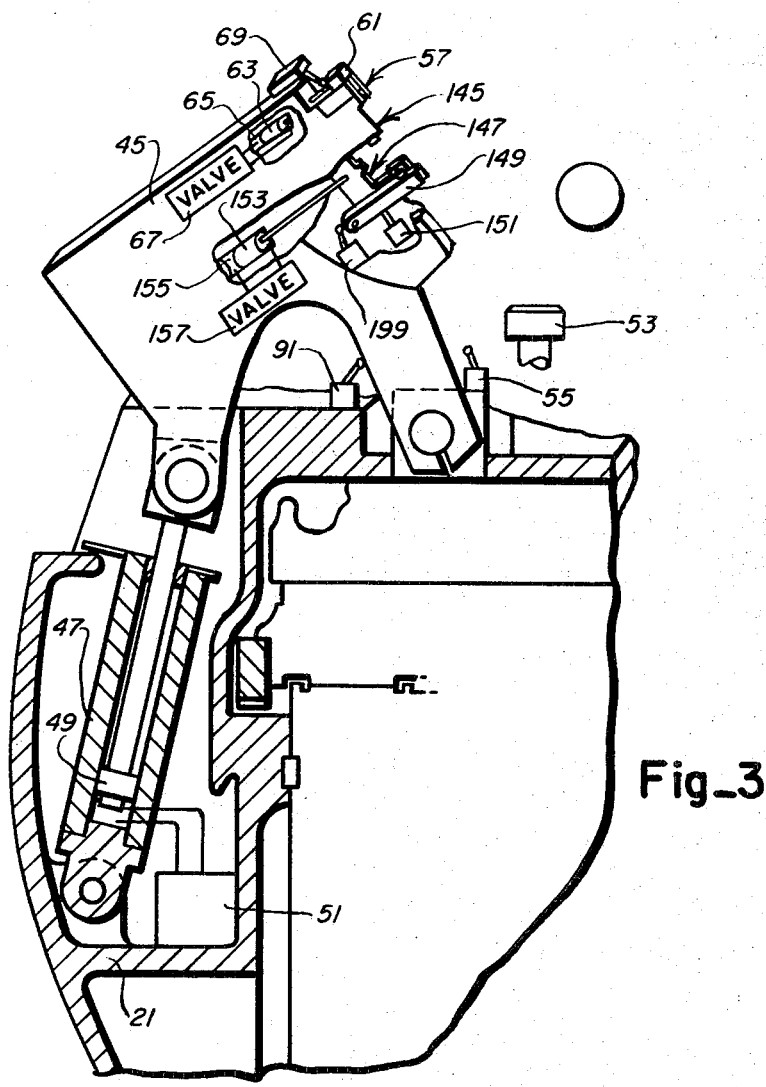
Fig_3
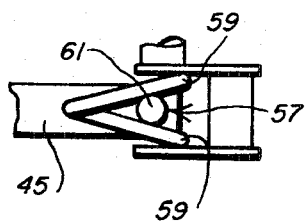
Fig_4

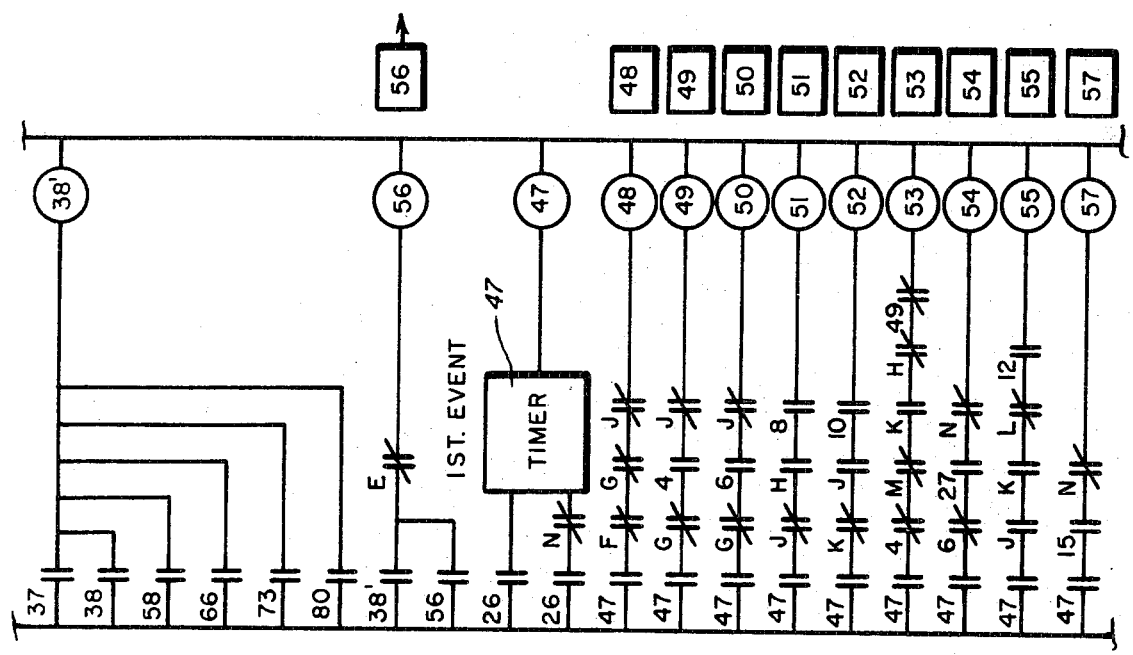
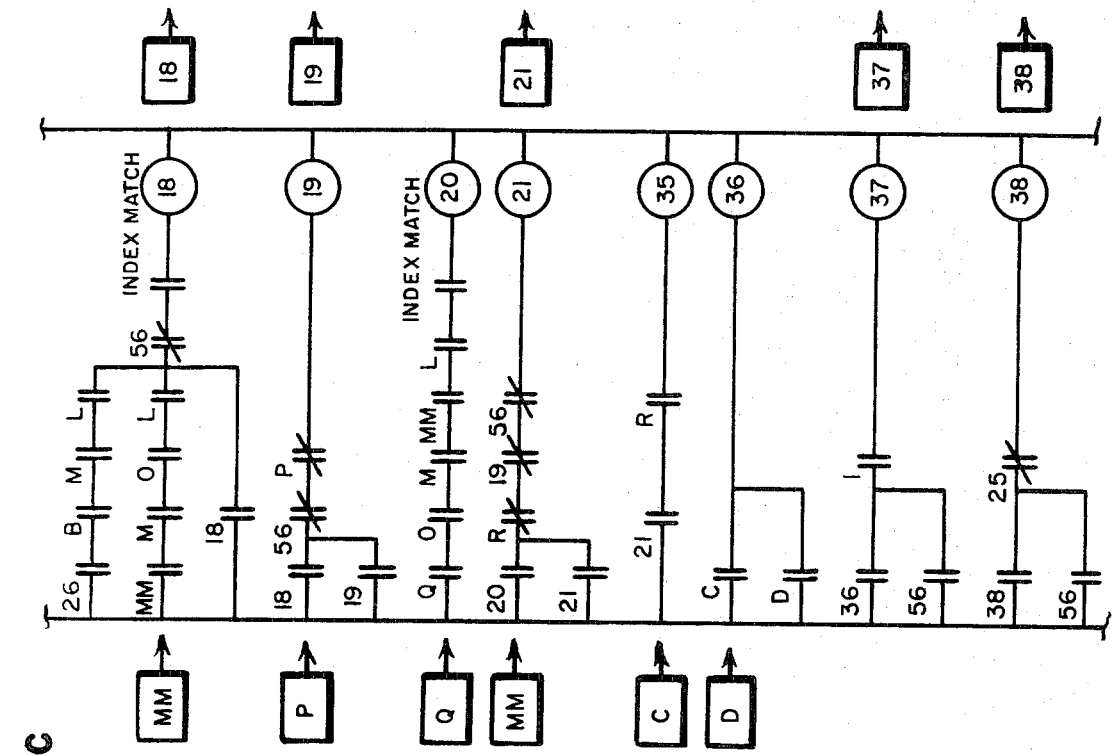
Fig.-9c

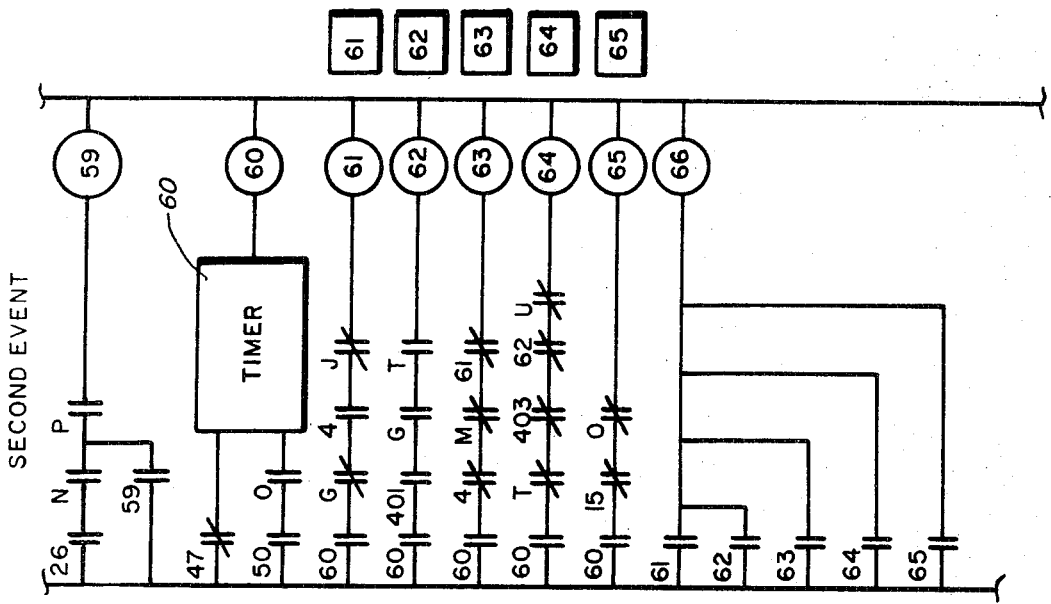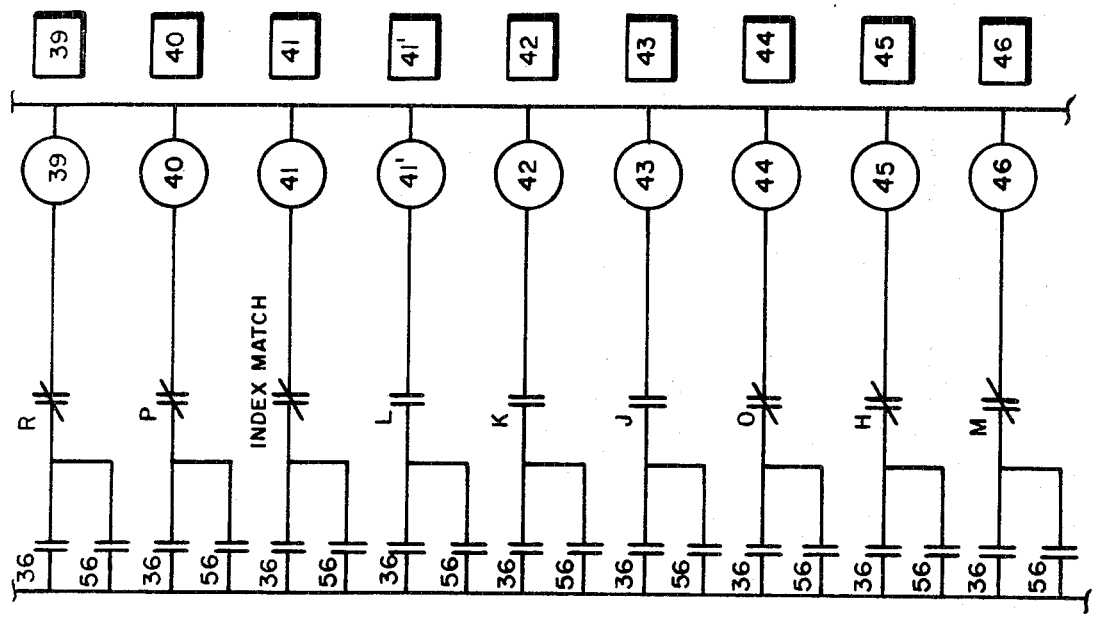
Fig-9d

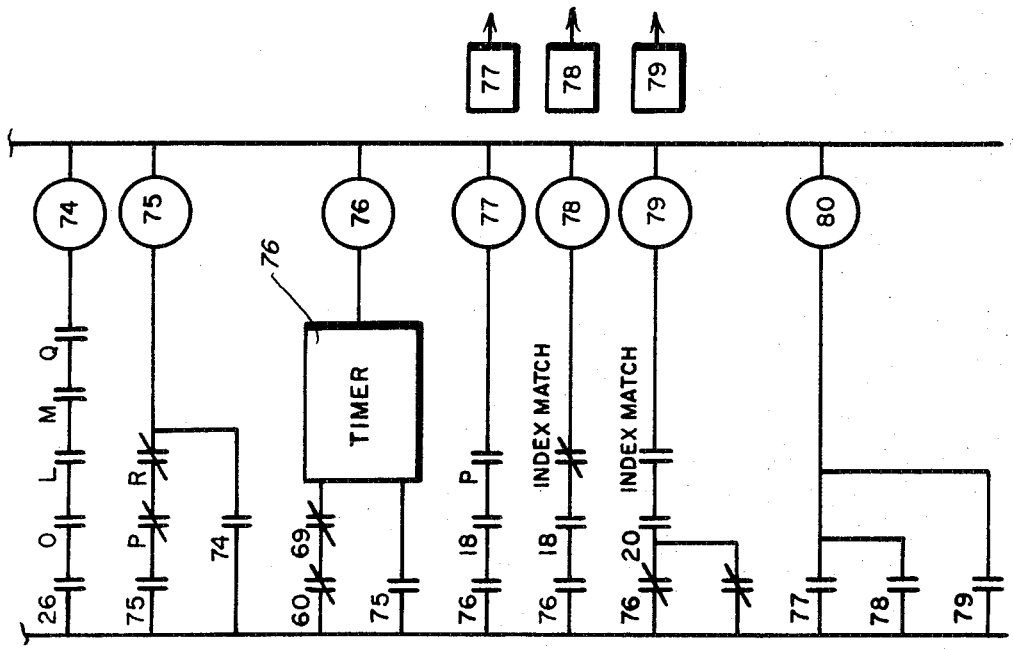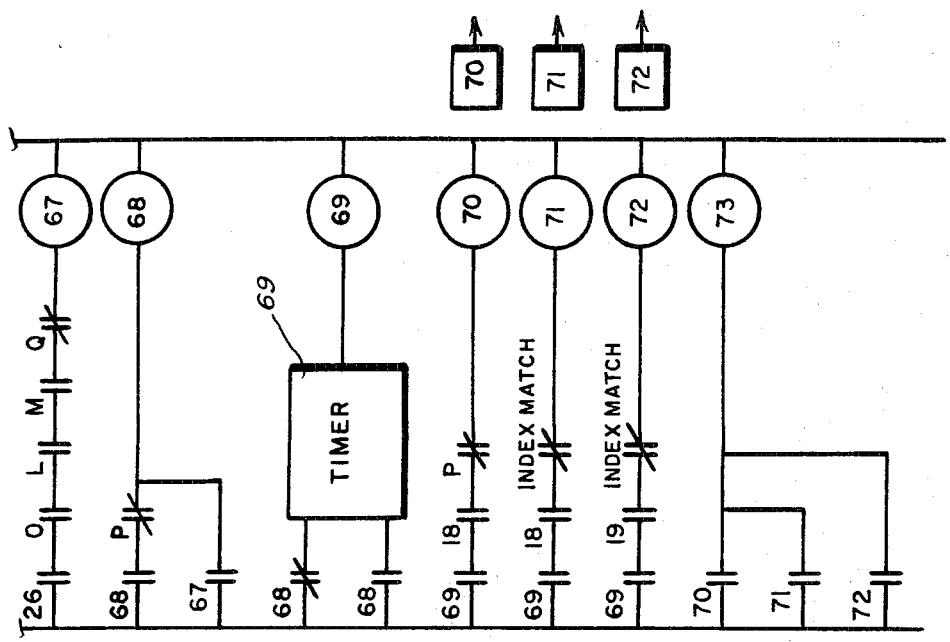
Fig-9f

MACHINE TOOL FAULT INDICATOR

This invention relates to a machine tool having a plurality of mechanisms undergoing a predetermined sequence of operations under the control of an electrical circuit in a series of events, and more particularly to an auxiliary circuit for indicating a lack of any required starting condition to operate the machine in an automatic mode or the lack of any required sequential operation of a mechanism during an event and for interrupting the further operation of the machine tool until the fault causing the failure of the required condition is corrected.

In a machine tool, for example a grinding machine for grinding the crankpins of a crankshaft, an unground crankshaft is mounted in a workpiece holder and rotatably driven with a particular crankpin positioned coaxially with the axis of rotation and centered with the periphery of a rotating grinding wheel which is advanced against the rotating crankpin until it is ground to a desired size. Next, the grinding wheel is retracted and the crankshaft is moved both axially and rotationally to position another crankpin at the axis of rotation for another grinding operation, and this sequence of events is repeated for each grinding operation until all of the crankpins are ground, whereupon the finished crankshaft may be removed from the workpiece holder.

The positioning of a crankpin in the workpiece holder relative to the grinding wheel and the movements of both the workpiece holder and the grinding machine typically involve a plurality of mechanisms which may be operated in a manual mode or in a predetermined sequence of events in an automatic mode by a control circuit which includes a considerable number of limit switches, fluid pressure switches, push buttons and other electrical switch components. However, occasionally the electric switch components fail to operate properly and disable the grinding machine, and in a high production machine tool, such a disablement is costly and to be minimized. However, when a large number of electric switch components are involved, there is often considerable difficulty in diagnosing and correcting the particular fault involved.

Accordingly, an object of the invention is to provide an electric controlled machine tool with an auxiliary circuitry for indicating a faulty switch component.

Another object of the invention is to provide auxiliary circuitry for indicating a fault in an initial starting condition of a machine tool.

An additional object of the invention is to provide a machine tool control system with auxiliary circuitry for indicating a fault in the sequential events of a grinding operation.

A further object of the invention is to provide a machine tool control system with auxiliary fault indicating circuitry which will prevent the starting or continuation of an automatic mode of operation until all faults are corrected.

Still other objects, features and advantages of the present invention will become apparent to those skilled in the art from a reading of the following detailed description wherein:

FIG. 3 is a partial perspective view of a positioning mechanism for a workpiece and associated switch elements for axially locating a crankpin and carrying workrest and gage mechanisms;

FIG. 4 is a sectional view taken along the lines 4—4 in FIG. 3 and showing the operation of the axial locator mechanism;

FIG. 9a–f shows other portions of the control circuit and illustrates the logic of the sequence controller for producing output logic signals in response to input logic signals.

Figure 1:
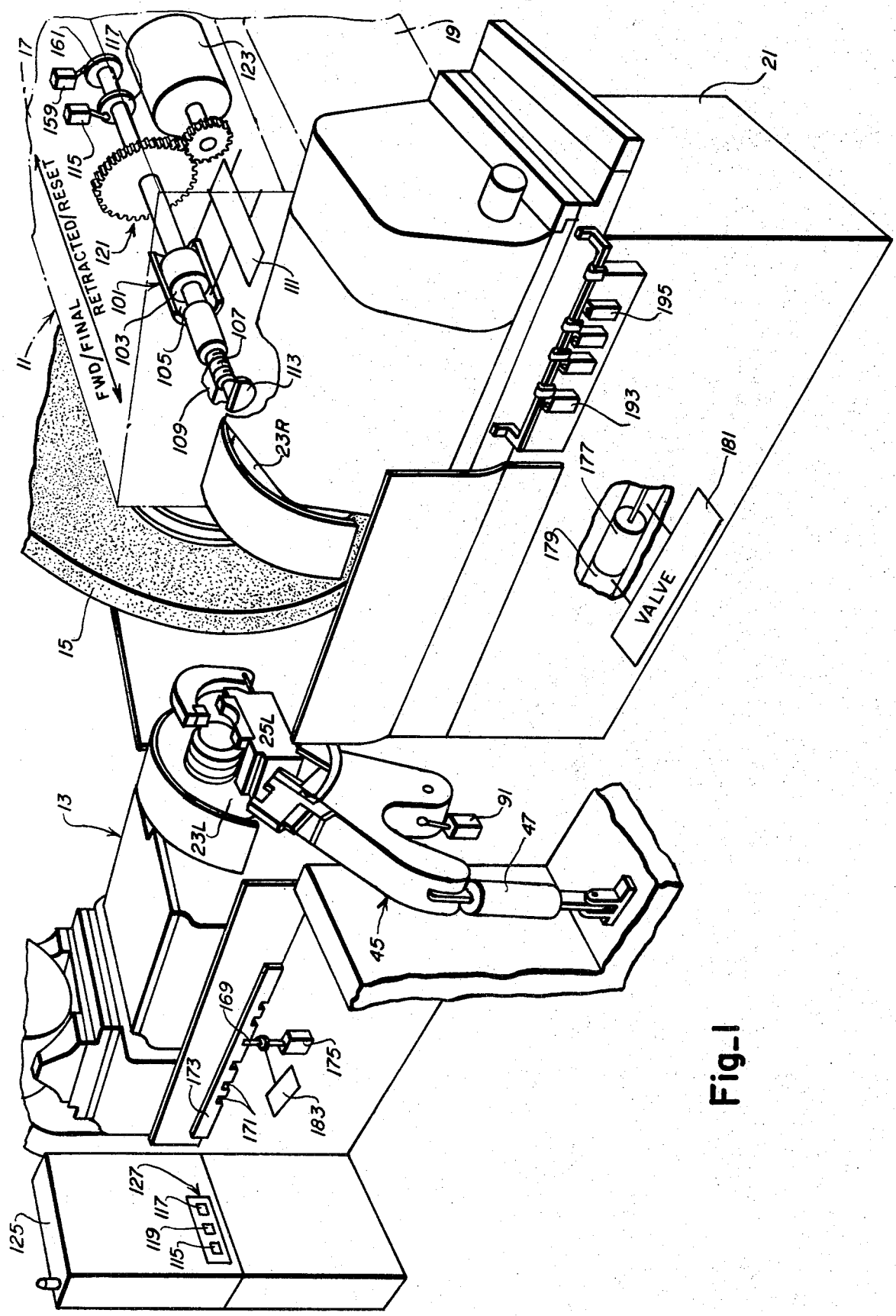
FIG. 1 is a diagrammatic view of a grinding machine having a plurality of mechanisms operated sequentially by a control system with an auxiliary fault indicating circuitry constructed in accordance with the present invention.

Referring now in detail to the figures in the drawing, and more particularly to FIG. 1, there is shown diagrammatically a grinding machine, generally indicated 11, for grinding the pins of a crankshaft which may be mounted in a workpiece carriage, generally indicated 13. The grinding machine 11 includes a grinding wheel 15 rotatably carried by a wheel base 17 which is slidably supported on a bed 19 for movement to and from the workpiece carriage 13, and the workpiece carriage 13 is slidably supported on another bed 21 for movement transverse to the slidable movement of the grinding wheel base 17 to position different crankpins for grinding. The workpiece carriage 13 includes generally similar left and right headstocks 23L, 23R respectively, for receiving the workpiece, and the headstocks 23L, 23R are rotatably driven to enable the crankpins to be ground to a cylindrical configuration. The movements of the grinding wheel 15 and workpiece carriage 13 are effected by electrical and hydraulic arrangements as more particularly described in U.S. Pat. No. 3,118,258 and 3,716,949, to which reference may be made for further details.

Figure 2:
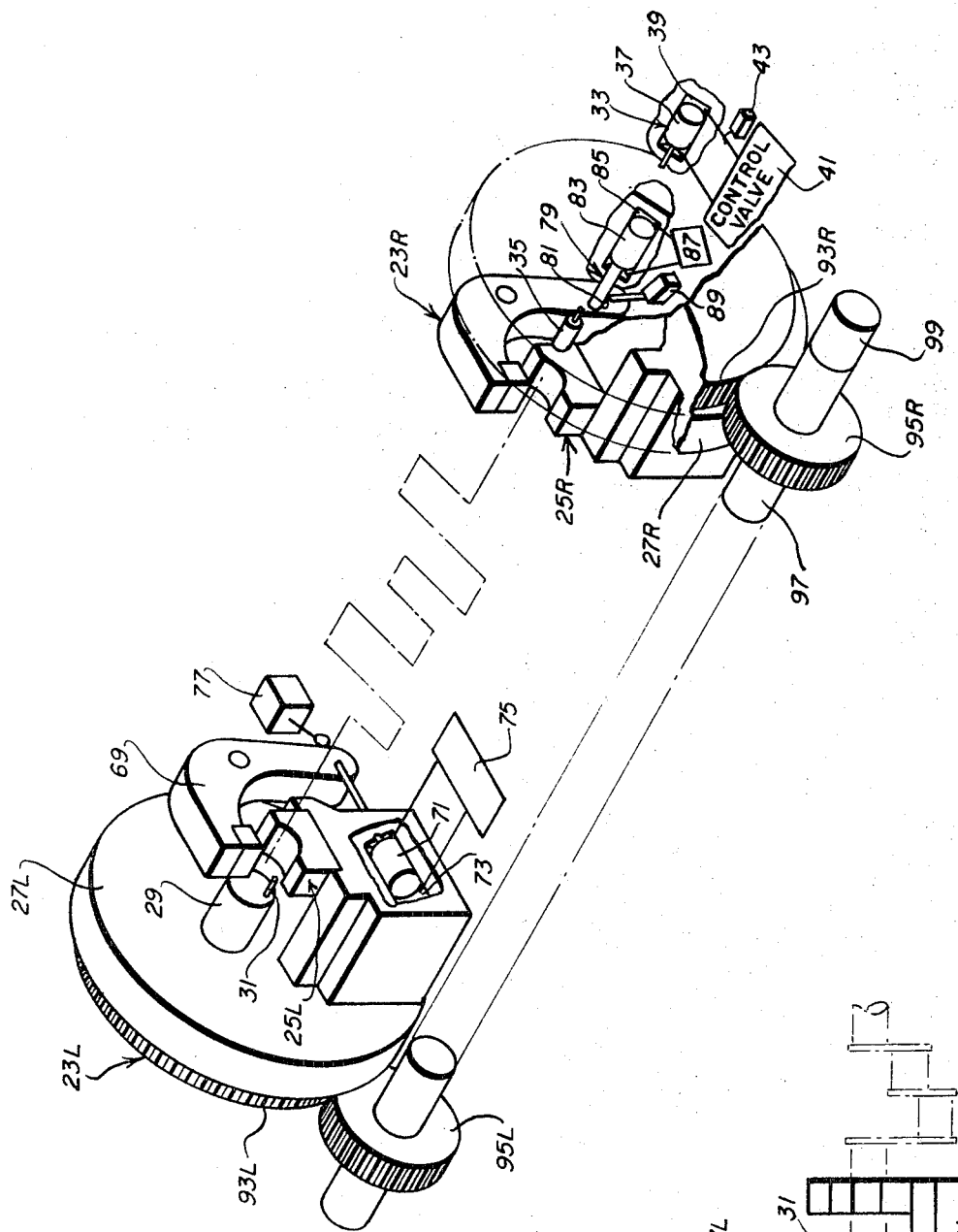
FIG. 2 is a partial perspective view of a workpiece holder and associated electric switch elements.

As more particularly shown in FIG. 2, an unground crankshaft is mounted in the workpiece carriage 13 by placing the opposite ends of the crankshaft in similar clamping mechanisms, generally indicated 25L, 25R respectively, which are carried by rotatable drive plates 27L, 27R respectively associated with the left and right headstocks 23L, 23R. The clamping mechanisms 25L, 25R are carried on the rotatable drive plates 27L, 27R so that the opposite ends of the crankshaft are spaced from the axis of rotation of the rotatable drive plates 27L, 27R, and the crankshaft must be rotated in the clamping mechanisms 25L, 25R until the first crankpin to be grounded is coaxial with the axis of rotation of the headstocks 23L, 23R. To facilitate the proper alignment of the first crankpin, the left drive plate 27L carries an indexing spindle 29 having a projecting stud 31 which is received in a corresponding indexing bore in the end of the crankshaft when the axis of the first crankpin is coaxial with the axis of rotation of the drive plates 27L, 27R.

When the operation of the grinding machine 11 is started, the left end of the crankshaft is pressed against the indexing spindle 29 by the operation of an engager mechanism, generally indicated 33, which pushes an engager rod 35 against the right end of the crankshaft. As shown, the engager rod 35 is mechanically connected to a piston 37 which is slidably disposed in a cylinder 39, and the piston 37 is driven by the pressure of hydraulic fluid supplied through suitable inlet and outlet conduits under the control of a suitable solenoid operated valve 41. A hydraulic pressure switch 43 is connected to the inlet conduit of the cylinder 39, and when the crankshaft is pressed against the indexing spindle 29 the pressure switch 43 is operated to enable the operation of a positioning mechanism 45.

As shown in FIGS. 1 and 3, the positioning mechanism 45 is pivotally supported on the bed 21 of the workpiece carriage 13 and is moved from a lowered rest position to a raised operating position by applying hydraulic fluid to a cylinder 47. The cylinder 47 has a piston 49 slidably disposed therein which is mechanically connected to the positioning mechanism 45, and the piston 49 is driven to raise the positioning mechanism 45 by hydraulic fluid which is supplied to the cylinder 47 through inlet and outlet conduits under the control of a suitable valve 51 which is actuated by a solenoid. Upon reaching the raised operating position, the positioning mechanism 45 engages an adjustable stop abutment 53 and operates a limit switch 55 which energizes another solenoid 51' associated with the engager valve 51 to reduce the pressure on the engager rod 35 and which enables the operation of an axial locating mechanism, generally indicated 57, which is carried by the positioning mechanism 45.

As more particularly shown in FIGS. 3 and 4, the upper portion of the positioning mechanism 45 is received between the arms of a crankshaft adjacent the crankpin to be ground, and the axial locating mechanism 57 includes a pair of locating fingers 59 for engaging the adjacent crankarms. The locating fingers 59 are supported about a common pivot point on the positioning mechanism 45 and are spread apart by a rod 61 to axially align the crankpin with the grinding wheel 15. As shown, the rod 61 is mechanically connected to a piston 63 which is slidably disposed in a hydraulic cylinder 65 in the positioning mechanism 45, and the piston 63 is advanced rearwardly to spread the locating fingers 59 by hydraulic fluid which is supplied to the cylinder 65 through conventional inlet and outlet conduits under the control of a suitable solenoid operated valve 67.

Upon aligning the first crankpin with the grinding wheel 15, the advancement of the rod 61 operates a limit switch 69 to enable the clamping mechanisms 25L, 25R to grip the ends of the crankshaft. As more particularly shown in FIG. 2, the clamping mechanisms 25L, 25R each include a pivotally supported clamp arm 70 which is pressed against the crankshaft by a piston 71 which is slidably disposed in a hydraulic cylinder 73. The piston 71 is mechanically connected to the clamp arm 70 and driven by hydraulic fluid which is supplied to the cylinder 73 through suitable inlet and outlet conduits under the control of a solenoid operated valve 75. As the clamping mechanisms 25L, 25R close against the crankshaft, the clamp arms 70 operate limit switches 77 which enable latching mechanisms associated with each headstock 23L, 23R and generally indicated 79 to lock the clamp arms 70 closed to prevent an accidental opening of the clamping mechanism 25L, 25R. As shown in FIG. 2, the latching mechanisms 79 each include a pin 81 which is moved adjacent the pivotally supported clamp arms 70 to limit the pivotal movement thereof. Each latching pin 81 is connected to a piston 83 which is slidable in a hydraulic cylinder 85, and the pistons 83 are driven to the latching position by hydraulic fluid supplied to the cylinder 85 through conventional inlet and outlet conduits under the control of a solenoid operated valve 87.

As the latching pins 81 move to the locking position, associated limit switches 89 are operated which enable the axial locator mechanism 57 to be retracted and the positioner mechanism 45 to be lowered to the rest position where a limit switch 91 is operated to cause the headstocks 23L, 23R to be rotatably driven for a grinding operation. As more particularly shown in FIG. 2, each of the drive plates 27L, 27R have associated gears 93L, 93R which are driven by corresponding gears 95L, 95R carried on a shaft 97 extending parallel to the axis of rotation of the drive plates 27L, 27R and driven by a suitable motor, not shown.

When the rotatably driven headstocks 23L, 23R reach a predetermined speed, as sensed by a suitable plugging switch 99, the grinding operation may be initiated by advancing the rotating grinding wheel 15 toward the workpiece. As more particularly shown in FIG. 1, the grinding wheel 15 is carried by the wheel base 17 which is advanced from a retracted position to a forward position by a rapid hydraulic feed arrangement, generally indicated 101, which is in the form of a piston 103 slidably disposed in a cylinder 105 formed in the bed 19 of the grinding machine 11. The piston 103 is secured to a feed screw 107 threadably engaging a half nut 109 associated with the wheel base 17, and the wheel base 17 is advanced to the forward position by supplying hydraulic fluid to the rearward end of the cylinder 105 through conventional inlet and outlet conduits under the control of a suitable solenoid-operated rapid feed valve 111 so as to drive the piston 103 forward until the end of the feed screw 107 abuts against a forward stop 113.

Figure 5:
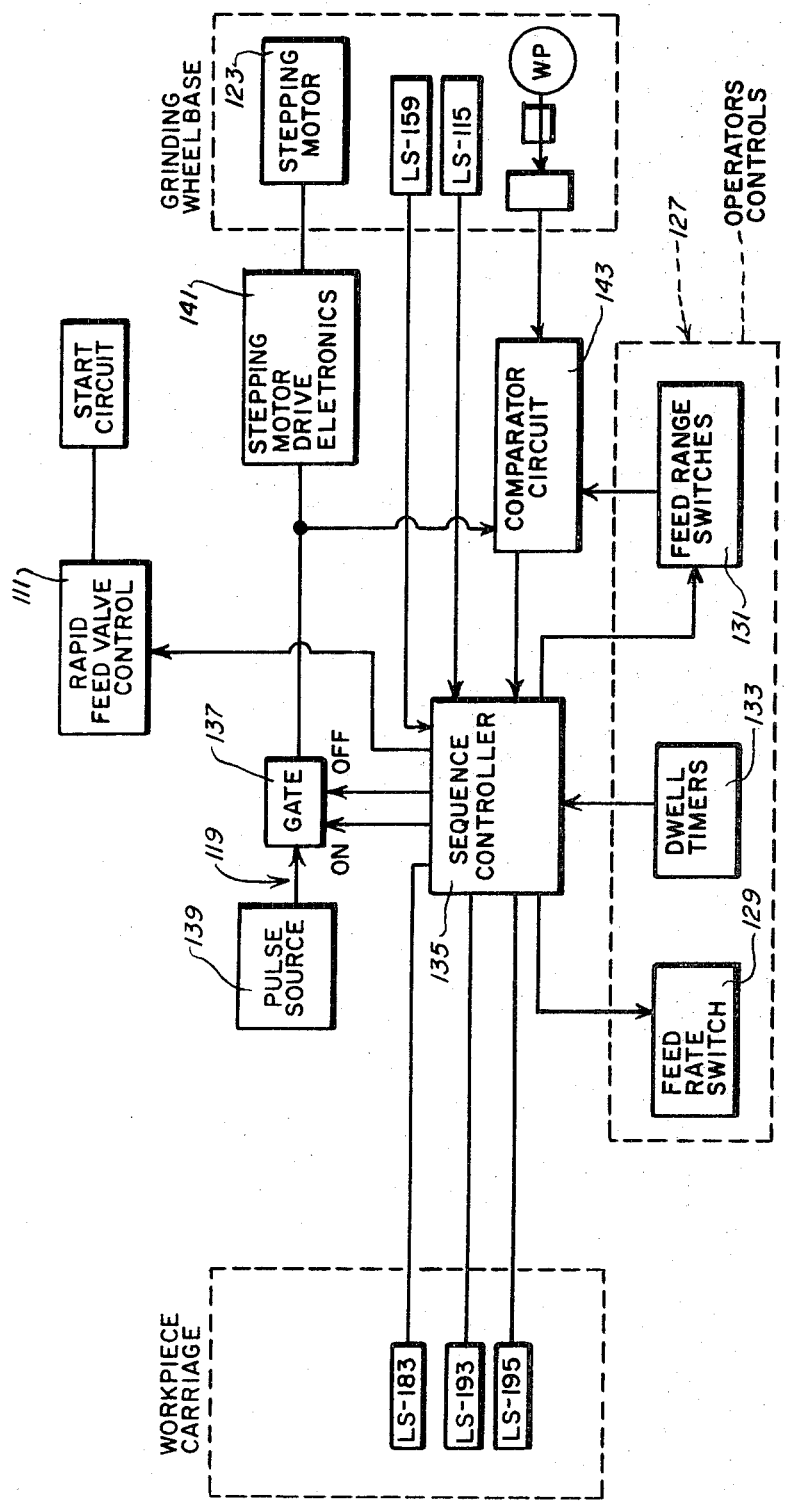
FIG. 5 is a diagrammatic view of a grinding wheel base and associated moving mechanism and a control circuitry for effecting a sequence of grinding operations.

When the grinding wheel base 17 reaches the forward position, a limit switch 115 is operated by a rearward projection 117 of the feed screw 107 to initiate the operation of an electrical feed control circuit, generally indicated at 119 in FIG. 5, for effecting further advancement of the grinding wheel 15. As shown in FIG. 1, the feed screw 107 is driven through a gear drive, generally indicated 121, by an electric motor 123 operated by the electrical feed control circuit 119 which may be located in a control panel 125 adjacent the grinding machine 11. The electrical motor 123 may be a suitable stepping motor operated in accordance with pulses supplied from the electrical feed control circuit 119 with each pulse being representative of a predetermined feed distance or degree of rotation of the feed screw 107 for effecting relative movement between the wheel base 17 and the bed 19.

In grinding a crankpin workpiece to a desired size, the grinding wheel 15 is typically advanced from the forward position to a final position in a sequence of grinding movements involving preselected feed rates over preselected feed ranges followed by preselected dwell periods. To enable an operator to establish a program of grinding movements, the grinding control circuit 119 includes operator programming controls, generally indicated at 127 and located on the control panel 125, which consists of feed rate switches 129, feed range switches 131, and dwell timers 133 which may be individually set by an operator. The feed range switches 131 determine the total number of pulses to be supplied to the stepping motor 123, and hence the distance advanced during the grinding sequences, while the feed rate switches 129 determine the rate at which the selected number of pulses are supplied to the motor 123 and the dwell timers 133 determine period of time the grinding wheel 15 remains at the end point of a corresponding feed range before undergoing further movement. The details of the feed rate switches 129, the feed range switches 131 and the dwell timers 133 are not described, and the details of the movement of the grinding wheel 15 are only partially described since they are adequately explained in the above-mentioned U.S. Pat. No. 3,716,949, to which reference may be made for further details of the involved electrical feed control circuit 119.

When the limit switch 115 is operated by the movement of the grinding wheel 15 to the forward position, a sequence controller 135 is actuated to supply an ON signal to a gate 137 to enable pulses to pass from a suitable pulse source 139 to a suitable motor drive circuit 141 for operating the motor 123 to advance the grinding wheel 15 into engagement with the workpiece. As more particularly described in U.S. Pat. No. 3,716,949, the pulse source 139 may be in the form of a frequency convertor receiving pulses from a crystal oscillator and producing output pulses at a rate determined by the feed rate switches 129. At the same time, pulses are also supplied to a suitable comparator circuit 143 and when the number of pulses equals a first feed range, as determined by a signal from the feed range switches 131, the comparator circuit 143 actuates the sequence controller 135 which supplies an OFF signal to the gate 137 for a period of time determined by the dwell timers 133. Upon completion of a selected dwell period, the sequence controller 135 again supplies an ON signal to the gate 137 to effect the next grinding sequence in the same manner.

After preliminary grinding of the crankpin to achieve a uniform cylindrical configuration, the sequence controller 135 operates the positioning control valve 51 to raise the positioning mechanism 45 to the operating position in the manner previously described. Upon movement of the positioning mechanism 45 to the operating position, a suitable gage, generally indicated 145, is placed on the workpiece and the limit switch 55 is operated to advance a workrest mechanism, generally indicated 147, into engagement with the crankpin. As more particularly shown in FIG. 3, the gate 145 includes calipers 149 which are resiliently supported on the positioning mechanism 45 for engagement with the crankpin and are mechanically connected to a suitable sensor 151 providing a signal to the comparator circuit 143 indicative of the actual size of the crankpin. The workrest 147 is mechanically connected to a piston 153 slidably disposed in a hydraulic cylinder 155 of the positioning mechanism 45, and the workrest 147 is advanced against the crankpin by hydraulic fluid supplied to the cylinder 155 under the control of a suitable solenoid operated control valve 157.

Upon engagement of the gage 145 with the crankpin, the gage 145 supplies a signal to the comparator circuit 143 which actuates the controller 135 to continue the grinding operation with further sequences of movements of the grinding wheel 15 until the gage 145 senses the desired size of the workpiece. As shown in FIG. 5, the gate 145 is connected to the comparator circuit 143 which is also connected to the feed range switches 131, and when the size of the workpiece, as sensed by the gage 145, equals the desired size, as indicated by the feed range switches 131, the comparator circuit 143 supplies a signal to the sequence controller 135 indicating the completion of the grinding operation.

When the crankpin is ground to the desired size, the sequence controller operates the workrest control valve 157 to retract the workrest 147 from the crankpin and operates the positioner control valve 51 to lower the positioner mechansm 45 to the rest position in the manner previously described whereupon the limit switch 91 is operated. At the same time, the rapid feed valve 111 is operated to drive the piston 103 rearwardly to return the grinding wheel to the retracted position whereupon another limit switch 159 is operated by another projection 161 carried by the feed screw 107. In addition, the electrical feed control circuit 119 is operated in a reverse mode, and the sequence controller 135 supplies an ON signal to the gate 137 to enable pulses from the pulse source 139 to be supplied to the stepping motor drive circuit 141 to reversely drive the motor 123 to a reset position.

When the positioner mechanism 45 and the grinding wheel 15 are returned to the rest positions, as indicated by the operation of the limit switches 91 and 159, the workpiece is moved to position another crankpin for grinding. As more particularly shown in FIG. 1, the workpiece carriage 13 is slidably supported on the bed 21 for movement transverse to the grinding wheel 15, and the location of the workpiece carriage 13 relative to the grinding wheel 15 is determined by the engagement of a plunger 169 in one of a series of notches 171 of a spacing bar 173 associated with the workpiece carriage 13 and which corresponds to the crankpins of the crankshaft mounted in the workpiece carriage 13. To position the next crankpin for grinding, the plunger 169 is removed from the notch by operating a solenoid 175 which is mechanically connected to the plunger 169 to enable movement of the workpiece carriage 13. The workpiece carriage 13 is mechanically associated with a piston 177 slidably disposed in a hydraulic cylinder 179 formed in the bed 21, and movement of the piston 177 is effected by supplying hydraulic fluid to the cylinder 179 through conventional inlet and outlet conduits under the control of a suitable solenoid operated valve 181.

As the workpiece carriage 13 is slidably driven along the bed 21, the plunger 169 is resiliently urged against the spacing bar 173 by suitable biasing means, not shown, and when the next notch 171 is brought into alignment with the plunger 169, the plunger 169 moves into engagement with the notch 171 to stop the movement of the workpiece carriage 13. Reengagement of the plunger 169 in a notch 171 operates a limit switch 183 which deenergizes the valve 181.

Figure 6:
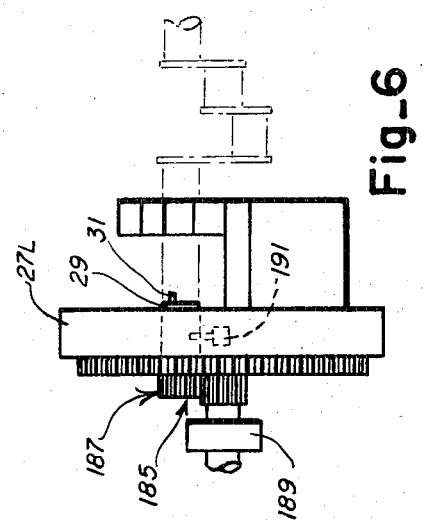
FIG. 6 is a diagrammatic illustration of a rotary indexing mechanism for a rotatable positioning differential crankpin at the axis of rotation of the workpiece holder.

At the same time the workpiece carriage 13 is being moved to axially displace the crankshaft, the crankshaft is rotated to coaxially align the next crankpin with the axis of rotation of the headstocks 23L, 23R. To enable the crankshaft to be rotated relative to the headstocks 23L, 23R, the clamping mechanisms 25L, 25R are lossened by deenergizing the clamp valve 75 to reduce the pressure acting on the pistons 71 associated with the clamp arms 70. Next, the crankshaft is acted upon by a rotary indexing mechanism, generally indicated 185 in FIG. 6, to rotate the index spindle 29 associated with the left drive plate 27L. As shown, the index spindle 29 is rotatably carried by the drive plate 27L and is connected by suitable gears, generally indicated 187, to an electromagnetic brake 189 which is rotatably about the axis of the drive plate 27L. Normally, the indexing spindle 29 is locked against rotation by a solenoid operated plunger 191 which is also carried by the drive plate 27L and received in a notch of the indexing spindle 29 associated with one of the crankpins to be ground. When the next crankpin is to be rotatably indexed for grinding, the plunger 191 is removed from the indexing spindle 29 and the electromagnetic brake 189 is energized to effect a relative rotational movement of the brake 189 with the rotating drive plate 27L to rotate the indexing spindle 29. The rotational movement of the crankshaft continues for a period of time determined by a suitable timing mechanism, not shown, until the next crank pin is coaxially aligned with the axis of rotation of the headstocks 23L, 23R, whereupon the brake 189 is deenergized and the plunger 191 engages a notch in the indexing spindle 29 which corresponds to the next crankpin.

The reengagement of the rotary indexing plunger 191 may be indicated by suitable means, not shown, and when the workpiece carriage plunger 169 is also reengaged with the next notch 171, an index match is signaled which initiates the grinding operation as previously described.

When the last crankpin has been ground, as indicated by the operation of a limit switch 193 in conjunction with the movement of the workpiece carriage 13 to a location for engagement by the index plunger 169 in the last notch 171, the workpiece carriage 13 is moved to the initial position under the control of the carriage valve 181 until a limit switch 195 is operated in conjunction with the reengagement of the carriage plunger 169 in the first notch 171. Upon movement to the initial position, the headstocks are brought to rest and the latch valves 87 are operated to remove the latch pins 81 from adjacent the clamp arm 70 so that the clamping mechanisms 25L, 25R may be fully opened to enable the ground crankshaft to be replaced with another workpiece.

As described above, the mechanisms of the grinding machine 11 operate in a sequence of movements under the control of limit switches and solenoid operated valves. Typically, the sequence of movements are effected automatically in a mass production machine; however, manual controls in the form of push buttons and selector switches are also provided to enable an operator to selectively move individual mechanisms for such purposes as adjustment and repair of the mechanisms. To enable the mechanisms to be operated in a sequence of movements, in either an automatic mode or a manual mode, the limit switches, valves, push buttons and selector switches form a portion of a control circuit, generally indicated 201 in FIGS. 7 and 8, which includes the sequence controller 135 in FIG. 5. Each of the push buttons, selector switches, and limit switches are arranged to provide input signals interfacing with the sequence controller 135 while the solenoids and other relays are arranged to operate in response to signals from the sequence controller 135.

Figure 7:
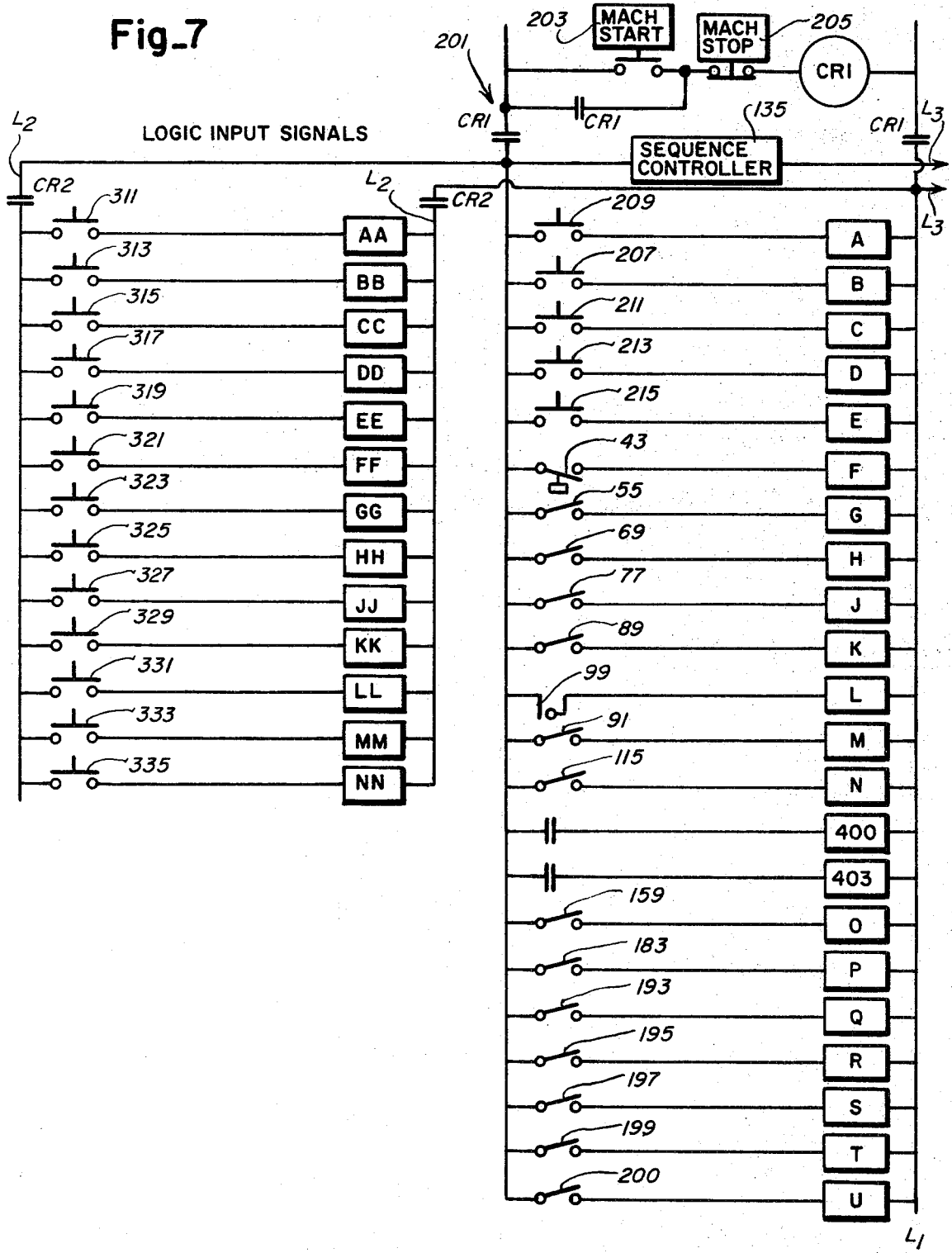
FIG. 7 is a portion of a control circuit for operating the mechanisms of the grinding machine and providing input logic signals to a sequence controller.
Figure 8:
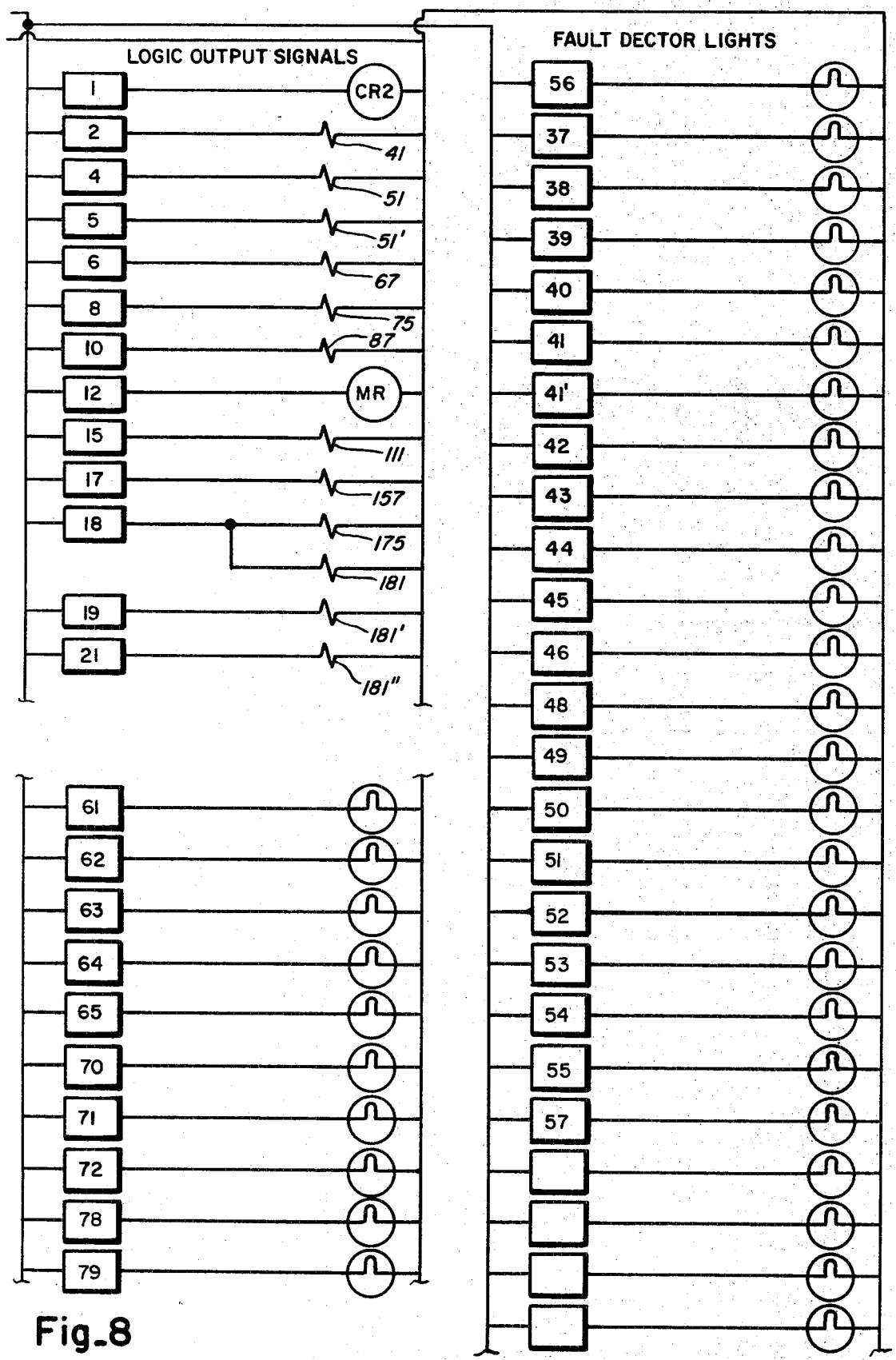
FIG. 8 is another portion of the control circuit for operating the mechanisms of the grinding machine in response to output logic signals from a sequence controller.
Figure 9A:
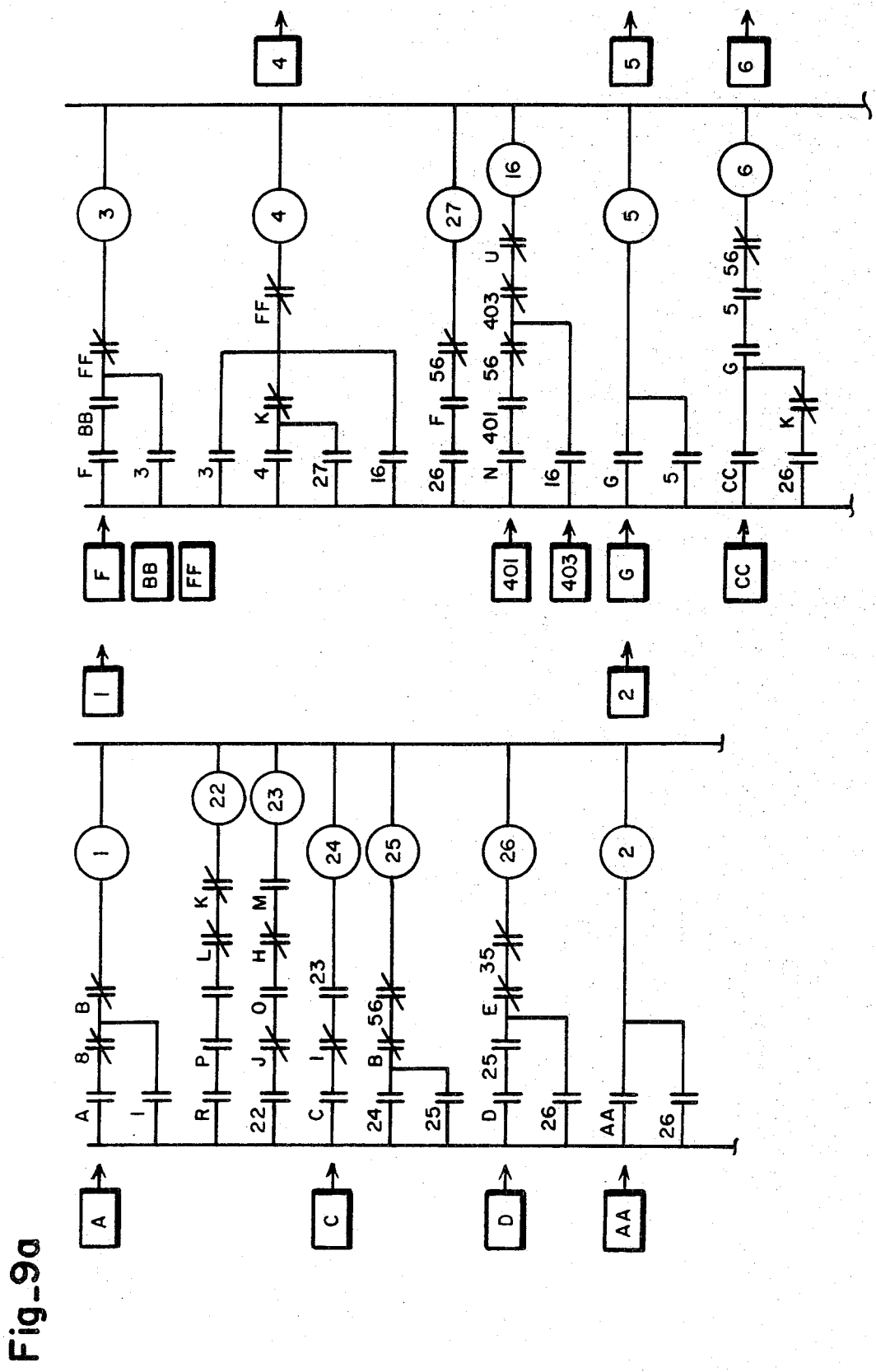
Figure 9B:
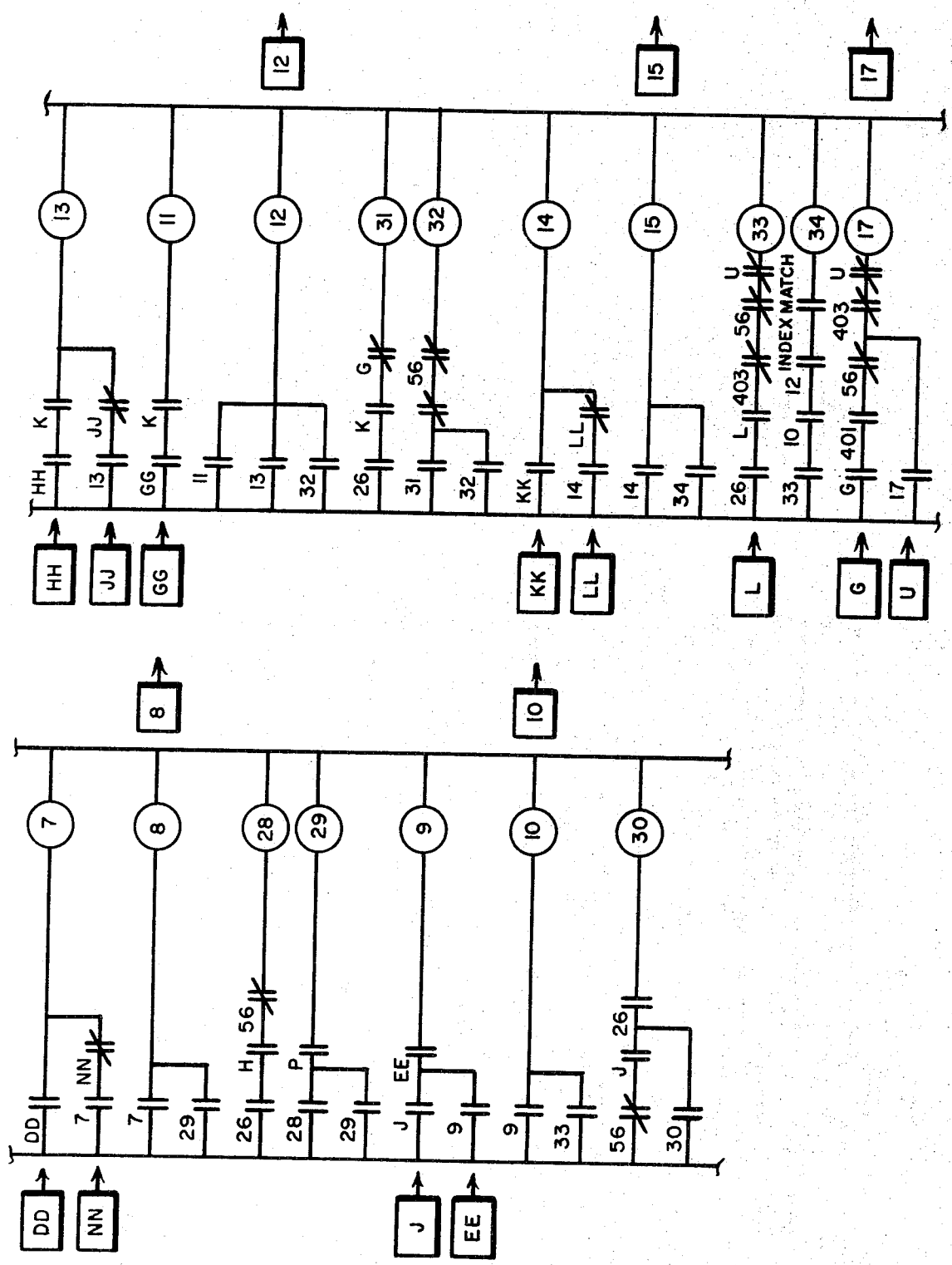
Figure 9E:
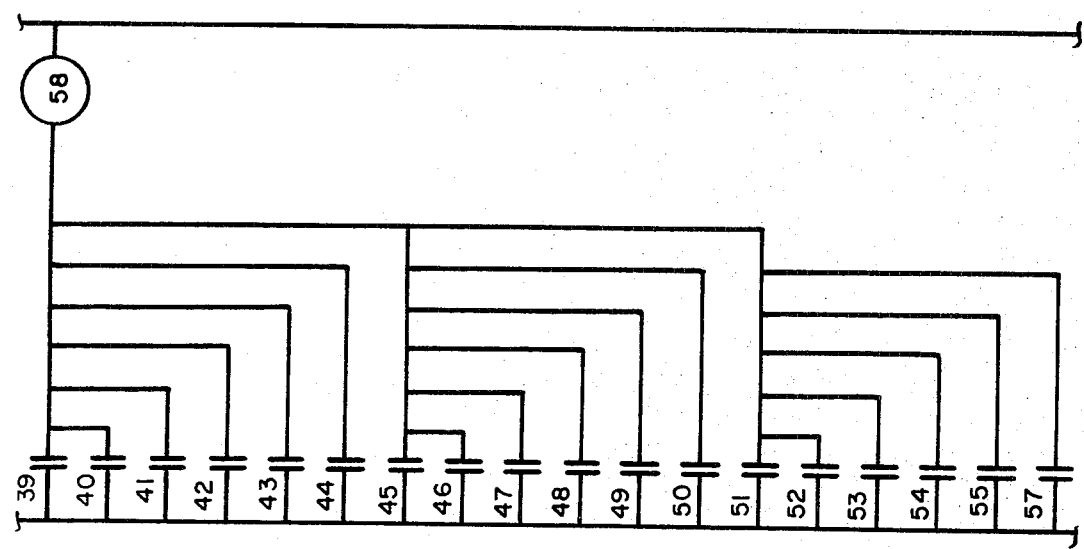

As more particularly shown in FIG. 7, each of the push button switches, selector switches and limit switches are connected in series with an associated input signal converter between 110V power conductors for converting 110V signals into input logic signals for interfacing with the sequence controller 135. Similarly, as shown in FIG. 8, the solenoids and relays are each connected in series with an associated output signal converter between 110V power conductors for interfacing with the sequence controller 135 to convert output logic signals into 110V signals operating the solenoids and relays. The sequence controller 135 may be any suitable programmable controller, such as Modicon Model 0-84 manufactured by the Modicon Corporation of Andover, Massachusetts, and the sequence controller may be programmed with a suitable electronic logic as shown, by way of example only, in FIG. 9. Although the logic circuitry of the controller could be illustrated in different forms, it is shown in FIG. 9 in the form of relay circuits arranged between parallel power supply lines with the input logic signals being indicated to the left of the power supply lines and the output logic signals being indicated to the right of the power supply lines.

As previously mentioned, the grinding machine 11 may be operated in either a manual mode or an automatic mode according to the choice of the operator, and the push button switches and selector switches for both modes of operation are located on the control panel 125 along with a normally open MACHINE START push button switch 203 and a normally closed MACHINE STOP push button switch 205, as shown in FIG. 7. The START and STOP push button switches 203 and 205 respectively are connected in series with a power relay CR1 across a pair of power input terminals, and the control circuit 201 may be energized by momentarily depressing the MACHINE START push button to energize the power relay CR1 and close normally opened contacts CR1 leading to the previously mentioned power conductors of the control circuit 201 as well as holding contacts CR1 connected in parallel with the MACHINE START push button 203. To prevent the push button and selector switches associated with the manual mode of operation from interfering with the operation of the grinding machine 11 during an automatic mode of operation, the operator switches associated with the manual mode of operation are connected between a pair of power conductors $L_1-L_1$ which are separately energizable only through normally open contacts CR2. The other push button switches and limit switches along with the sequence controller 135 are connected between another pair of power conductors $L_2-L_2$ which are energized by the closing of the contacts CR1 as previously described.

To operate the grinding machine 11 in the manual mode, it is first necessary to depress a RESET push button 207 to disable the controls associated with the automatic mode of operation, as will be explained below, and then depress a MANUAL SELECT push button 209 to energize the power conductors $L_1-L_1$. As shown in FIG. 7, the depression of the MANUAL SELECT push button energizes an associated logic signal converter A to supply an input logic signal A to the sequence controller 135 to operate the logic circuitry. As shown in FIG. 9, the input logic signal A closes corresponding normally open contacts A which are connected in series with normally closed contacts 8 and B, and a logic relay 1 which is energized to close associated holding contacts 1 connected in parallel with the contacts A and 8 and to provide an output logic signal 1. As shown in FIG. 8, the logic signal 1 operates a corresponding output signal logic converter 1 to energize a control relay CR2 which closes the previously mentioned contacts CR2 to energize the power conductors $L_1$—$L_1$ and the manual mode switches connected therebetween.

With the manual mode switches energized, the engager mechanism 33 may be operated by depressing the ENGAGER push button switch 311 to supply an input logic signal AA to the sequence controller 135. The input logic signal AA closes corresponding contacts AA to energize a logic relay 2 which operates a corresponding output logic converter 2 to energize the solenoid operated engager valve 41. As previously described, the hydraulic fluid supplied to the cylinder 39 operates a hydraulic pressure switch 43 which is connected in series with a logic signal converter F between the power conductors $L_1$—$L_1$, so as to cause an input logic signal F to be produced which closes corresponding contacts F which are connected in series with normally open contacts BB and normally closed contacts FF to condition a logic relay 3 for energization. Similarly, the engager mechanism 33 may be retracted by opening the ENGAGER push button selector switch to remove the input logic signal AA and open the corresponding contacts AA to deenergize the logic relay 2 and remove the logic output signal 2 to deenergize the solenoid operated engager valve 41.

Next, the positioner mechanism 45 may be raised to the operating position by depressing the POSITIONER UP push button 313 to produce an input logic signal BB which closes the corresponding contacts BB mentioned above to energize the logic relay 3 which closes associated holding contacts 3 connected in parallel with the contacts F and BB and at the same time closes contacts 3 connected in series with a logic relay 4. The logic relay 4 closes associated holding contacts 4 which are serially connected with normally closed contacts K in parallel with the contacts 3. In addition, the logic relay 4 produces an output logic signal 4 which energizes the solenoid operated positioner valve 41 to raise the positioner mechanism 45 to the operated position whereupon the limit switch 55 is operated. The limit switch 55 causes an logic input signal G to be produced which closes corresponding contacts G to energize a logic relay 5 which closes associated holding contacts 5 and produces a logic output signal 5 which energizes a solenoid 51' to reduce the pressure on the engager rod 35.

With the positioner mechanism 45 at the raised operating position, the axial locating mechanism 57 may be advanced by depressing a LOCATOR SELECTOR switch 315 to produce an input logic signal CC which closes corresponding contacts CC connected in series with normally open contacts G and 5, now closed and normally closed contacts 56 to energize a logic relay 6 which produces a logic output signal 6 which energizes the solenoid operated valve 67 to effect the axial positioning of a crankpin as previously described.

When the crankpin is axially aligned, the clamping mechanisms 25L, 25R may be closed by depressing a CLAMPS CLOSE push button switch 317 to produce an input logic signal DD which closes corresponding contacts DD to energize a logic relay 7 which closes holding contacts 7, which are serially connected with normally closed contacts NN in parallel with the contacts 7, and at the same time closes associated contacts 7 to energize a serially connected logic relay 8. The logic relay 8 produces an logic output signal 8 which energizes the solenoid operated clamp valve 75 to close the clamping mechanisms 25L, 25R as described hereinabove. Similarly, the clamping mechanisms 25L, 25R may be opened by depressing a CLAMPS OPEN push button 335 to produce an input logic signal NN which opens the above mentioned corresponding normally closed contacts NN, to deenergize the logic relay 7, thereby opening the associated contacts 7 to deenergize the logic relay 8 to remove the logic output signal 8 and deenergize the solenoid operated clamp valve 75.

With the closing of the clamping mechanisms 25L, 25R, the limit switches 77 are operated to produce an input logic signal J which closes corresponding contacts J connected in series with normally open contacts EE to condition a logic relay 9 for operation. Next, the latch mechanisms 79 may be operated by depressing a LATCH selector switch 319 to produce a logic input signal EE which closes the above mentioned contacts EE to energize the logic relay 9 which closes associated holding contacts connected in parallel with the contacts J, and at the same time closes associated contacts 9 to energize a serially connected logic relay 10. The logic relay 10 produces a logic output signal 10 which energizes the solenoid operated latch valve 87 to lock the clamping mechanisms 25L, 25R closed as previously described. In addition, the movement of the latch mechanisms 79 operate the limit switch 89 which produces an logic input signal K which opens the previously mentioned normally closed contacts K which are connected in series with the logic relay 4, thereby deenergizing the solenoid operated positioner valve 51 to lower the positioner mechanism 45 to the rest position as previously described. In addition, the lowering of the positioner mechanism 45 opens the limit switch 55 to remove the logic input signal G, thereby opening the corresponding contacts G to deenergize the logic relay 6 to remove the logic output signal 6 to deenergize the solenoid operated locator valve 67 and retract the locating fingers 59 as described above.

When the clamping mechanism 25L, 25R are latched closed by the latch mechanisms 79, the above mentioned logic input signal K closes corresponding contacts K connected in series with normally open contacts GG to condition a logic relay 11 to be operated, and at the same time closes corresponding contacts K connected in series with normally open contacts HH to condition a logic relay 13 for operation. The headstocks 25L, 25R may now be jogged by depressing a HEADS JOG push button switch 323 to produce an logic input signal GG which closes the corresponding normally open contacts GG to energize the logic relay 11 which closes associated contacts 11 to energize a serially connected logic relay 12 to produce a logic output signal 12 which energizes a motor relay MR to effect the operation of a motor driving the shaft 97 to rotate the headstocks 25L, 25R. Alternatively, the headstocks 25L, 25R may be driven by depressing a HEADS RUN push button switch 325 to produce a logic input signal HH which closes the corresponding normally open contacts HH to energize the logic relay 13 which closes associated holding contacts 13 serially connected with normally closed contacts JJ in parallel with the contacts HH and K, and at the same time closes associated contacts 13 connected in parallel with the logic relay 12 to produce the logic output signal 12 which effects the rotational drive of the headstocks 25L, 25R as described hereinabove. When the headstocks 25L, 25R reach a predetermined speed, a suitable plugging switch 99 is operated to produce a logic input signal L which closes corresponding contacts L in the sequence controller as will be explained below. To stop the rotational drive, a HEADS STOP push button switch 327 may be depressed to produce a logic input signal JJ which opens the above mentioned normally closed contacts JJ to deenergize the logic relay 13 and open the associated contacts 13 to deenergize the logic relay 12, thereby removing the logic output signal 12.

To advance the grinding wheel 15 to the forward position, a WHEELBASE IN push button switch 329 may be depressed to produce a logic input signal KK which closes corresponding contacts K to energize a logic relay 14 which closes associated contacts 14 connected in series with normally closed contacts LL in parallel with the contacts KK. In addition, the logic relay 14 closes other associated contacts to energize a serially connected relay 15 to produce a logic output signal 15 which energizes the solenoid operated rapid feed valve 111 to advance the grinding wheel 15 as previously described until the feed screw abuts against the forward stop 113. Similarly, the wheel base 17 may be moved to the retracted position by depressing a WHEEL BASE OUT push button switch 331 to produce a logic input signal LL which opens the corresponding normally closed contacts LL to deenergize the logic relay 14 and open the associated contacts 14 to deenergize the logic relay 15, thereby removing the logic output signal 15 and deenergizing the solenoid operated rapid feed valve 111.

When the crankpin is properly aligned with the axis of rotation of the headstocks 25L, 25R, an "index match signal" is provided by a suitable index match logic relay, not shown, to close associated contacts throughout the sequence controller 135 as a safety measure. With the index match contacts closed, an indexing operation may be commenced to position the crankpin for grinding. To begin an indexing operation, the positioner mechanism 45 must be in the lowered rest position as indicated by the operation of a limit switch 91, the wheel base must be in the retracted position as indicated by the operation of a limit switch 137, and the headstocks 25L, 25R must be rotatable driven at the predetermined speed as indicated by the operation of the plugging switch 99. The limit switch 91 produces a logic input signal M which closes corresponding contacts in the sequence controller and the plugging switch 99 produces a logic input signal L which closes corresponding contacts L in the sequence controller.

To initiate an indexing operation by traversing the workpiece carriage 13, an INDEXING push button switch 33 may be depressed to produce an logic input signal MM which closes corresponding contacts MM connected in series with the now closed contacts, M, O, L and normally closed contacts 56 to energize a logic relay 18. The logic relay 18 closes associated holding contacts connected in parallel with the contacts MM, M, O and L and at the same time produces a logic output signal 18 which energizes the solenoid operated carriage index plunger 175 and the solenoid operated carriage valve 181. With the energization of the solenoid operated valve 175, 181, the movement of the workpiece carriage 13 is initiated along with the rotation of the crankshaft by the energization of the electromagnet brake 189 by suitable means, not shown, as previously described. In addition, the logic relay 18 closes associated contacts 18 connected in series with normally closed contacts 56 and P to energize a logic relay 19 connected in parallel with the contacts 18 which closes associated holding contacts 19 connected in parallel with the contacts 18 and produces a logic output signal 19 which energizes a solenoid operated valve 181' to drive the workpiece carriage to the right.

As the crankshaft is moved axially and rotated, the index match contacts are opened to deenergize the logic relay 18, thereby opening the associated contacts 18 and removing the logic output signal 18 to deenergize the solenoid operated valve 175 for the plunger 169 and the solenoid operated valve 181. The movement of the carriage continues due to the operation of the valve 181', and the carriage index plunger 169 is normally urged against the spacing bar 173 as previously described. When another indexing notch 171 is brought into alignment with the plunger 169, the plunger is moved into engagement with the notch 171 to stop the movement of the workpiece carriage 13 and at the same time operates a limit switch 183. The closing of the limit switch 183 produces a logic input signal P which opens the above-mentioned corresponding normally closed contacts P to deenergize the logic relay 19 which opens associated holding contacts 19 and removes the logic output signal 19 to deenergize the solenoid operated valve 181'. Although not described, the rotary indexing of the crankpin continues until the plunger 191 engages a corresponding notch in the index spindle 29 which deenergizes the electromagnetic brake 189 in the manner described above and again closes the index match contacts throughout the sequence controller 135.

The indexing movement of the workpiece carriage may continue in the manner described above until all the crankpins have been aligned with the axis of rotation of the headstocks 23L, 23R for undergoing a grinding operation. With the workpiece carriage 13 positioned to enable the last crankpin to be ground, a limit switch 193 is closed which produces logic input signals Q to close corresponding contacts Q throughout the sequence controller 135. At the conclusion of the grinding of the last crankpin, with the positioner mechanism 45 in the rest position, the wheel base 17 in the retracted position, and the headstocks 23L, 23R running at the predetermined speed, the input logic signals L, M and O are produced to close corresponding contacts in the sequence controller 135 and the index match contacts are closed. As shown in FIG. 9, contacts Q, L, M and O and index match are connected in series with normally opened contacts MM to condition the logic relay 20 for energization. Accordingly, the INDEX pushbutton switch 333 may be depressed to produce a logic signal MM to energize the logic relay 18, previously described, to produce a logic output signal 18 which energizes the solenoid operated carriage index plunger 175 and the solenoid operated carriage valve 181, previously described. At the same time, the logic input signal MM closes the abovementioned corresponding contacts connected in series with the relay 20 which closes associated contacts 20 connected in series with normally closed contacts R, 19 and 56 to energize a logic relay 21 which closes holding contacts 21 connected in parallel with the contacts 20 and also produces the logic output signal 21 which energizes the solenoid operated valve 181'', not shown, to effect the return of the carriage to an initial position. When the workpiece carriage 13 reaches the initial position, a limit switch 195 is closed to produce logic input signals R which open the corresponding normally closed contacts R to deenergize the logic relay 21 to remove the logic output signal 21 and deenergize the solenoid operated valve 181''. At the same time, the return of the workpiece carriage 13 to the initial position enables the plunger 169 to reengage a notch 171 associated with the initial position.

When it is desired to operate the grinding machine 11 in the automatic mode to successively grind the crankpins of a crankshaft, it is first necessary to disengage the operator controls associated with the manual mode of operation. The disengagement of the operator controls may be effected by depressing a RESET push button switch 207 to produce a logic input signal B which opens the normally closed contact B connected in series with the logic relay 1 so as to deenergize the logic relay 1 and remove the logic output signal 1, thereby deenergizing the control relay 2 and opening the associated contacts CR2 leading to the power conductors $L_2$—$L_2$. Next, an AUTOMATIC SELECT push button 211 may be depressed to produce a logic input signal C to close corresponding contacts C connected in series with normally closed contacts 1 associated with the logic relay 1 and normally open contacts 23 to energize a logic relay 24. However, for the contacts 23 to be closed, the grinding machine 11 must be in an initial position for starting a grinding operation. As shown in FIG. 9, normally open contacts R, P and index match are connected in series with normally closed contacts L and K to energize a logic relay 22 having associated contacts 22 connected in series with normally open contacts M and O and normally closed contacts H and J to energize the logic relay 23 having the above mentioned associated contacts 23 serially connected with the logic relay 24. In the initial condition, the limit swtich 195 is closed to provide the logic input switch R, the carriage index plunger is in the first notch 171 to close the limit switch 183 to provide the logic input switch P, and the index match contacts must be closed. The headstocks 23L, 23R must not be running to produce the logic input signal L and the latches must not be operated to produce the logic input signal K. The clamps must be opened so as to not produce logic input signal J, the wheel base must be in the retracted position to produce the logic input signal O, the locator must be retracted to not produce the logic input signal H, and the positioner must be in the rest position to produce the logic input signal M.

When all of the initial conditions are satisfied, the logic relay 24 is energized to close associated contacts 24 connected in series wth normally closed contacts B and 56 to energize logic relay 25 which closes associated holding contacts 25 connected in parallel with the contacts 24. At the same time, the logic relay 25 closes associated contacts 25 which are connected in series with normally open contacts D and normally closed contacts E and 35 to condition logic relay 26 for operation. After loading a crankshaft in clamping mechanisms 25L, 25R as previously described, the automatic operation may be initiated by depressing a CYCLE START push button 213 to produce a logic input signal D which closes the contacts D to energize logic relay 26 which closes associated holding contacts 26 connected in parallel with the contacts D and 25.

When the automatic mode of operation is initiated the energization of the logic relay 26, associated relay contacts 26 are closed throughout the sequence controller 135. As shown in FIG. 9, the closing of the relay contacts 26 energizes the logic relay 2 to provide a logic output signal 2 which energizes the solenoid operated engager valve 41, as previously described to press the crankshaft against the index spindle 29. An increasing hydraulic pressure in the engager cylinder 39 operates the pressure switch 43 to produce the logic input signal F which closes corresponding contacts F connected in series with contacts 26 and normally closed contacts 56 to energize logic relay 27. The energization of logic relay 27 closes associated contacts 27 connected serially with normally closed contacts K to energize logic relay 4 which closes holding contacts 4 connected in parallel with the contacts 27 and produced logic output signal 4.

As previously described, the logic output signal 4 energizes the solenoid operated positioner valve 51 to raise the positioner mechanism 45 to the raised operating position whereupon the limit switch 55 is operated to produce the logic input signal G which closes corresponding contacts G as previously described to energize the logic relay 5 and produce the logic output signal 5 which energizes the solenoid 51 to reduce the pressure on the engager rod 35. At the same time, the logic input signal G closes corresponding contacts G serially connected through now closed contacts 26 and normally closed contacts K to energize logic relay 6 to produce a logic output signal 6.

The logic output signal 6 energizes the solenoid operated valve 67 associated with the locator mechanism 57 to spread the locator fingers 59 and axially position a crankpin for grinding. As the locating fingers 59 spread under the advancement of the rod 61, as previously described, the rod actuates the limit switch 69 to produce the logic input signal H.

The logic input signal H closes corresponding contacts H connected in series with now closed contacts 26 and normally closed contacts 56 to energize logic relay 28 which closes associated contacts 28 connected in series with now closed contacts P to energize a logic relay 29 which closes holding contacts 29 connected in parallel with the contacts 28, and at the same time closes contacts 29 connected in parallel with the previously mentioned contacts 7 to energize logic relay 8. The energization of logic relay 8 produces logic output signal 8 which energizes the solenoid operated valve associated with the clamping mechanism 25L, 25R. With the closing of the clamping mechanism, the limit switches 77 are operated to produce a logic input signal J. The logic input signal J closes corresponding contacts J connected in series with normally closed contacts 56 and the now closed contacts 26 to energize logic relay 30 which closes holding contacts 30 connected in parallel with the contacts 56 and J, and at the same time closes associated contacts 30 connected in parallel with the contacts 9 to energize the logic relay 10. The energization of the logic relay 10 produces logic output signal 10 which energizes the solenoid operated latch valve 87 to advance the latch pins 81 and lock the clamp arms 69 closed.

With the closing of the latches, the limit switch 89 is operated to produce the logic input signal K which opens the normally closed contact K connected in series with the logic relay 4 so as to remove the logic output signal 4 to deenergize the solenoid operated positioner valve 51 to lower the positioner mechanism 45 to the lowered rest position. In addition, the logic input signal K opens corresponding normally closed contacts K connected in series with the logic relay 6 to remove the logic output signal 6 and deenergize the solenoid operated valve 67 to enable the locator mechanism 57 to be retracted.

As the positioner mechanism 45 moves from the raised operating position toward the lowered rest position, the limit switch 55 is opened to remove the logic input signal G which enables corresponding normally closed contacts G to again close, and the logic input signal K closes corresponding contacts connected in series with the now closed contacts 26 and normally closed contacts G to energize logic relay 31 which closes associated contacts 31 connected in series with normally closed contacts 56 to energize logic relay 32 which closes associated holding contacts 32 connected in parallel with the contacts 31 and at the same time closes associated contacts 32 to energize logic relay 12. The energization of the logic relay 12 produces a logic output signal 12 which energizes the relay MR which initiates the rotatable drive of the headstocks 23L, 23R.

As the headstrocks reach a predetermined speed, the plugging switch 99 closes to produce logic input signal L which closes corresponding contacts L connected in series with now closed contact 26, normally closed contacts 403 and 56 to energize logic relay 33. Upon energization, the logic relay 33 closes associated contacts 33 connected in series with now closed contacts 10 and 12 and index match to energize logic relay 34 which closes associated contacts 34 connected in parallel with contacts 14 to energize logic relay 15. The energization of the logic relay 15 produces a logic output signal 15 which energizes the solenoid operated rapid feed valve 111 to advance the grinding wheel to the forward position. Upon reaching the forward position, the grinding wheel base 17 closes limit switch 115 to produce logic input signal N which initiates the operation of the electric feed control circuit 119 as previously described. During the operation of the electric feed control circuit, as previously described, the grinding wheel is advanced through a preliminary grinding operation. Upon completion of the preliminary grinding operation, as indicated by a signal supplied from the comparator circuit 143 to the sequence controller 135, contacts 401 are closed by suitable means, not shown, to produce a logic input signal 401. The logic input signal 401 closes corresponding contacts 401 connected in series with the now closed contacts N and normally closed contacts 56 and 403 to energize logic relay 16 which closes holding contact 16 connected in series with the contacts N, 401 and 56. At the same time, the logic relay 16 closes associated contacts 16 to energize serially connected logic relay 4 which closes holding contacts 4 as previously described and produces a logic output signal 4.

As the positioner mechanism 45 reaches the raised operation position the gage 145 is placed on the workpiece and the limit switch 55 is operated to produce a logic input signal G. As shown in FIG. 9, the logic input signal G closes corresponding contacts G connected in series with now closed contacts 401 and normally closed contacts 56 and 403 to energize logic relay 17 which closes holding contacts 17 connected in parallel with the contacts G, 401 and 56. The energization of the logic relay 17 produces a logic output signal 17 which energizes the solenoid operated valve 157 to effect the advancement of the work rest mechanism 147 into engagement with the crankpin as previously described.

As previously described, the grinding operation continues under the control of the electric feed control circuit 119 until the size of the crankpin, as sensed by the gage 145, equals the desired size as indicated by the feed range switches 131, whereupon the comparator circuit 143 supplies a signal to the sequence controller 135 indicating the completion of the grinding operation. Upon completion of the grinding operation, the sequence controller causes contacts 403, as shown in FIG. 7, to produce a logic input signal 403 which opens corresponding normally closed contacts 403 connected in series with the logic relay 17 to remove the logic output signal 17 to deenergize the solenoid operated valve 157 of the work rest 147, thereby retracting the work rest 147. At the same time, the logic input signal 403 to deenergize the serially connected logic relay 16 and open the associated contacts 16 to deenergize the serially connected logic relay 4, thereby removing the logic output signal 4 to deenergize the solenoid operated valve 51 and to lower the positioner mechanism 45 to the rest position. In addition, the logic input signal 403 opens corresponding normally closed contacts 403 to deenergize the serially connected logic relay 33 which opens associated contacts 33 to deenergize logic relay 34 and open associated contacts 34 to deenergize serially connected logic relay 15. The deenergization of logic relay 15 removes logic output switch 15 to deenergize the valve 111 of the rapid feed valve arrangement 101 to move the wheel base 17 to the retracted position.

When the wheel base 17 reaches the retracted position, and the positioner mechanism 45 reaches the lowered rest position, a indexing operation is initiated to position the next crankpin for grinding. As shown in FIG. 9, with the limit switch 159 closed to produce the logic input signal O and the limit switch 91 closed to produce the logic input signal M and the plugging switch 99 operated to produce the logic output signal L, corresponding serially connected contacts O, M and L are closed in series with now closed contact 26 to energize the logic relay 18 to effect a carriage indexing operation as previously described. As the indexing operation is initiated, the carriage index plunger is removed from the notch 171 which opens the limit switch 183 to remove the logic input signal P which opens corresponding contacts P to deenergize the serially connected logic relay 29. The deenergization of the logic relay 29 opens associated contacts 29 in series with the logic relay 8, thereby removing the logic output signal 8 to deenergize the solenoid operated valve 75 of the clamping mechanism 25L, 25R to relieve the pressure exerted against the ends of the crankshaft by the clamp arms 69. However, the latch pins 81 prevent the opening of the clamping mechanism 25L, 25R during the indexing operation. Accordingly, the crankshaft may be rotary indexed to align the next crankpin with the axis of rotation of the headstocks 23L, 23R, and upon completion of the indexing operation, the next crankpin may be ground as previously described.

Succeeding crankpins may be ground in the same manner until the last crankpin has been ground with the carriage index plunger 169 in the notch 171 corresponding to the last crankpin and with the limit switch 193 closed to produce the logic input signal Q. As previously described, upon completion of the grinding of the last crankpin, the carriage is returned to the enable position by the energization of the logic relay 21 which closes associated contacts 21 connected in series with normally open contacts R to condition a logic relay 35 for operation. When the workpiece carriage 13 reaches the initial position and closes the limit switch 195 to produce the logic input signal R, the corresponding contacts R are closed to energize the logic relay 35 which opens associated normally closed contacts 35 to deenergize the serially connected logic relay 26, thereby opening the associated contacts 26 throughout the sequence controller 135 as described above to end the cycle of automatic operation. Upon ending the automatic operation, the headstocks are stopped and the latches are retracted and the clamps are opened to enable the ground crankpins to be replaced and the engager is retracted to enable the ground crankshaft to be replaced with another workpiece.

From the foregoing, it is apparent that a defective operation of any one of the previously described electrical switches, for example the limit switches and pressure switches, or the failure of any of the solenoid actuated valves necessary to effect the movement of an associated mechanism may constitute a fault disabling the further operation of the grinding machine in the automatic mode. Due to the number of electrical switches and solenoids involved, it is difficult and time consuming to diagnose and correct the particular fault disabling the operation of the grinding machine.

As will be described below, the present invention provides a fault detection system which indicates the particular fault disabling the operation of the grinding machine.

As previously described, to operate the grinding machine in the automatic mode of operation, it is first necessary to have all mechanisms of the machine in an initial starting position so as to energize the logic relays 22, 23 to enable the logic input signal C and D resulting from the depression of the AUTOMATIC SELECT push button switch 211 and the CYCLE START push button 213 to initiate the operation of the machine. As previously described, the limit switch 195 for the first crankpin must be closed, the limit switch 200 for the carriage index plunger must be closed, and the index match signal must be present. In addition, the plugging switch 99 for the rotatably driven headstocks 23L, 23R must be open, the limit switch 89 for the latching mechanism 79 must be open, and the limit switch 77 for the clamping mechanisms 25L, 25R must be open. Furthermore, the limit switch 159 must be closed with the wheel base retracted. The limit switch 91 must be closed with the positioner mechanism 45 in the rest position and the limit switch 69 must be open with the locator mechanism 33 retracted. If any of these conditions are not satisfied, then the grinding machine 11 may not be operated in the automatic mode.

To provide an indication of which initial conditions are not satisfied, the fault detector arrangement of the present invention includes a plurality of indicator lights on the control panel 125 which are selectively energized according to the particular initial condition at fault thereby providing a visual indication to the operator as to which initial condition must be corrected. As previously described, the operation of each of the above mentioned limit switches produces an associated logic input signal for operating corresponding contacts in the sequence controller 135. To indicate a fault condition with any of the above mentioned switches, each of the logic input signals has corresponding contacts of an electrical condition opposite to those associated with the logic relays 22, 23 and which are connected in series with another logic relay producing a logic output signal to energize an associated indicator light.

As more particularly shown in FIG. 9, the depression of either the AUTOMATIC SELECT push button switch 211 or the depression of the CYCLE START push button switch 213 provides logic input signals C and D as previously described. The logic input signals C and D close corresponding contacts connected in parallel with each other to energize a logic relay 36 which in turn closes associated contacts connected in series with each of the initial fault contacts to provide the logic output signals indicating the initial faults.

More particularly, logic contacts 36 are connected in series with normally closed contacts R to energize a relay 39 which produces a corresponding logic output signal 39 indicating that the first pin is not in position for grinding. Another set of contacts 36 are connected in series with normally closed contacts P to energize logic relay 40 to produce a logic output signal 40 which energizes a serially connected light 40 to indicate that the plunger 169 is not in a notch 171. Contacts 36 are connected in series with normally closed index match contacts and logic relay 41 to produce a logic output signal 41 which energizes an associated light 41 if the index match signal is not present. Another set of contacts 36 are connected in series with normally open contacts L to energize logic relay 41' to produce a corresponding logic output signal 41' which energizes a serially connected light 41' if the headstocks 23L, 23R are running to operate the plugging switch 99. Another set of contacts 36 are serially connected with normally open contacts K to energize a logic relay 42 which produces a logic output signal 42 to energize an associated light 42 if the latch pins 81 are advanced. Another set of normally open contacts 36 are connected in series with normally open contacts J to energize logic relay 43 which produces a logic output signal 43 to energize an associated light 43 if the clamping mechanisms 25L, 25R are closed. Still another set of contacts 36 are connected in series with normally closed contacts 0 to energize a logic relay 44 which produces a logic output signal 44 to energize an associated light 44 if the wheel base 17 is not in the retracted position. In addition, another set of contacts 36 are connected in series with normally open contacts H to energize the logic relay 45 which produces a logic output signal 45 to energize an associated light 45 if the locator mechanism 33 is not in the retracted position. Still, another set of contacts 36 are connected in series with normally closed contacts M to energize a logic relay 46 which produces a logic output signal 46 to energize an associated light 46 if the positioner mechanism 45 is not in the lowered rest position.

Each of the logic relays 39 through 46 have associated contacts connected in parallel with each other and in series with a logic relay 58 and if any of the logic relays 39–46 are energized, the associated contacts will be closed to energize the relay 58 which in turn closes associated contacts 58 connected in series with a logic relay 38 which in turn closes associated contacts 38 connected in series with normally closed contacts E to energize a logic relay 56. Logic relay 56 closes holding contacts 56 connected in parallel with the contacts 38 and produces a logic output signal 56 which energizes an associated light 56 mounted on top of the control panel 125 indicating a general fault signal. As will be described below, the general fault light 56 is energized each time any fault occurs. At the same time, the energization of the logic relay 56 closes associated contacts 56 connected in series with normally closed contacts 25 to energize a logic relay 38 which closes associated holding contacts 38 connected in parallel with the close contacts 56 and produces a logic output signal 38 which energizes an associated light 38 indicating a fault in the automatic select operation. In addition, the energization of the logic relay 56 closes a plurality of associated contacts connected in parallel with the above mentioned contacts 36 which are closed to energize any of the logic relays 39–46 to indicate an initial fault.

Depending upon which initial fault indicator lights are energized, the initial fault disabling the operation of the machine may be quickly ascertained by an operator who may go to the machine and either visually determine the cause of the fault or may operate the particular switch to see of the switch itself is defective or in some way not operating properly. For example, it may be apparent that the wheel base 17 is not in the retracted position and therefore the limit switch 159 is not operated. However, if the wheel base 17 is in the retracted position and the limit switch 159 is operated, the resulting logic input signal may not be produced due to a defect in the switch itself or a short in the leads from the limit switch 159 or some other cause. When the fault has been corrected so that the limit switch 159 is closed to produce the logic input signal O, then the logic relay 44 will be deenergized to remove the logic output signal 44 and deenergize the associated light 44 indicating the fault. However, the general fault light 56 remains energized, and to restart the machine it is necessary for the CYCLE START push button switch 215 to be closed providing a logic input signal connected logic relay 56, thereby removing the logic output signal 56 to deenergize the general fault light 56. With the logic relay 56 deenergized, the associated contacts 56 serially connected with the above mentioned logic relays associated with the initial fault conditions are likewise opened. Moreover, when the logic relay 58 is deenergized, it opens the associated contacts 58 connected in series with the logic relay 38' as previously described.

As previously described, to begin the operation of the grinding machine 11 in the automatic mode, it is also necessary to first disengage the push buttons and selector switches provided on the control panel 125 for manipulation by the operator in the manual mode so as to prevent the operator from interferring with the operation of the machine while it is in the automatic mode. Accordingly, if the AUTOMATIC SELECT push button switch 211 is depressed while the logic relay 1 remains energized from a previous manual mode of operation, then the resulting logic input signal C associated with the AUTOMATIC SELECT push button will close corresponding contacts C to energize the logic relay 36 which closes associated contacts 36 connected in series with the now closed contacts 1 to energize a logic relay 37. The logic relay 37 produces an output signal 37 to energize an associated fault light 37 indicating that the macine must be reset from the manual mode of operation. At the same time, the logic relay 37 closes associated contacts 37 to energize a serially connected logic relay 38' which closes associated contacts 38' serially connected to the logic relay 56. As previously described, the logic relay 56 closes associated holding contacts 56 connected in parallel with the contacts 38' and produces a logic output signal 56 to energize the general fault light 56.

With the manual reset fault 37 indicated on the control panel 125 the operator must clear the fault by depressing the RESET push button 207 to produce the logic input signal B which opens the normally closed contacts B connected in series with the logic relay 1, thereby opening the contacts 1 connected in series with the logic relay 37, as previously described, to remove the logic output signal 37 and deenergize the manual reset fault indicator light 37. At the same time, the deenergization of the logic relay 37 opens the above-mentioned associated contacts 37 connected in series with the logic relay 38'. However, as discussed above, the logic relay 56 controlling the energization of the general fault light 56 remains energized due to the closed holding contacts 56. To clear the general fault signal, the CYCLE STOP push button 215 must be depressed to produce the logic input signal E which opens the normally closed contacts E to deenergize the logic relay 56 and effect the deenergization of the general fault signal 56 as previously described.

With the general fault signal 56 cleared, the operation of the grinding machine 11 in the automatic mode may be initiated by depressing the AUTOMATIC SELECT push button switch 211, thereby producing logic input signal C which closes corresponding contacts C to energize the serially connected logic relay 24 which closes associated contacts 24 connected in series with normally closed contacts B and 56 to energize a logic relay 25 which closes holding contacts 25 connected in parallel with contacts 24 and associated contacts 25 connected in series with normally closed contacts E and 35 to condition logic relay 26 for energization. Next, the CYCLE START push button switch 213 may be depressed to produce logic input signal D which closes corresponding contacts D to energize logic relay 26 which closes associated holding contacts 9, thereby initiating the operation of the grinding machine in the automatic mode.

As discussed above, in the operation of the grinding machine in the automatic mode, the signals produced by the operation of the various mechanisms must occur in a proper sequential relationship to continue the automatic operation. To facilitate the detection and correction of a fault occurring during the automatic mode of operation, the fault detector of the present invention provides signals indicating the failure of selected switches during a particular sequence of operations. In accordance with the present invention, the automatic operation of the grinding machine is divided into four events with the first event starting with the movement of the wheel base 17 from the retracted position and ending with the wheel base 17 at the forward position and the positioner mechanism 45 at the lowered rest position. The second event begins when the first event ends and continues through the grinding of a crankpin and ends when the wheels base 17 is again moved to the retracted position and the positioner mechanism 45 is again lowered to the rest position. The third event commences with the ending of the second event and includes the traversing of the workpiece carriage 13 and the rotary indexing of the next crankpin and comes to a conclusion when the next crankpin is positioned for grinding. The first, second and third events are repeated until the last crankpin has been ground whereupon the fourth event is initiated to move the workpiece carriage to the initial position and ends with the indexing of the first crankpin and the opening of the clamps to enable an operator to replace the ground crankpin with another workpiece.

To determine a failure in the sequential events described above, the beginning of each event intiates the operation of a timer which will complete its operation in the event of a failure and cause the general fault light to be energized. In addition, additional fault indicator lights will be energized to indicate the failure of a particular switch to provide the required signal in the proper sequential relationship.

As previously described, the automatic operation of the grinding machine 11 begins with the depression of the CYCLE START push buttons 213 to provide the logic input signal D which effects the energization of the logic relay 26. The logic relay 26 closes associated contacts throughout the logic circuitry of the sequence controller 135 as discused above. With the energization of the logic relay 26, associated contacts 26 are closed to initiate the operation of a timer 47 timing the operation of the machine through the first event described above. As shown in FIG. 9, the timer for the first event is enabled by the closing of an associated contact 9 serially connected with the timer, and the operation of the timer is a reset initiated by the closing of another associated contact 26 serially connected to the timer through closed reset contacts N in parallel with the other contacts 26. Briefly, as the operation of the grinding machine moves through the first event described above, the engager mechanism 33 is operated, the positioner mechanism 45 is moved to the raised operating position, the axial locator mechanism 57 is operated to position the first crankpin for grinding. The grinding operation continues with the closing of the clamp mechanisms 25L, 25R and the locking of the clamp arms 69 by the advancement of the latching pins 81. The headstocks 23L, 23R are rotatably driven until they reach a predetermined speed whereupon the wheel base 17 is advanced to the forward position while at the same time the positioner mechanism is lowered to the rest position.

As mentioned above, the first event ends when the wheel base 17 reaches the advanced position and operates the limit switch 115. If the limit switch 115 is operated to produce the logic input signal N, the above-mentioned normally closed contacts N connected in series with the timer 47 are opened to reset the timer indicating the successful completion of the first event. However, if the logic input signal N is not produced indicating that the wheel base did not reach the forward position, or the failure of the switch itself, than the timer completes its predetermined period of operation and energizes a serially connected logic relay 47 which closes associated contacts 47 serially connected with the previously mentioned relay 58 which closes associated contacts 58 serially connected with the logic relay 38' and the logic relay 38' closes associated contacts 38' connected in series with the normally closed contacts E to energize the logic relay 56, thereby effecting the energization of the general fault light 56 described about.

To indicate the particular sequence within the first event giving rise to the general fault signal, the logic relay 47 closes a plurality of associated contacts each connected in series with other contacts to energize a particular logic relay which produces an output signal energizing an associated light to provide a visual indication of the sequential fault. More particularly, associated contacts 47 are connected in series with normally closed contacts F, G and J to energize logic relay 48 which produces a logic output signal 48 energizing an associated light 48 if the engager pressure switch did not close to provide the logic input signal F. Another set of contacts 47 are connected in series to the normally closed contacts G, normally opened contacts 4 and normally closed contacts J and a logic relay 49. The contact 4 is closed by the logic relay 4, as previously discussed, to energize the solenoid operated valve 51 to move the positioner to the raised operating position, and accordingly, a fault signal will be indicated if the limit switch 55 is not closed by the movement of the positioner mechanism 45 to the raised operating position so as to produce the logic input signal G. Therefore, the logic relay 49 will be energized to produce the logic output signal 49 energizing the associated light 49 to indicate a fault caused by the failure of the operation of the limit switch 55.

Similarly, associated contacts 47 are connected in series with normally closed contacts H, normally opened contacts 6, normally closed contacts J and logic relay 50. The contacts 6 are closed by the energization of the logic relay 6 to energize the solenoid operated valve 67 of the locator mechanism 57, and accordingly, the logic relay 50 will be energized by the failure of the operation of the locator advance limit switch 69 to produce the limit switch H. Therefore, the logic relay 50 will produce the logic output signal 50 to energize an associated fault light 50. In addition, associated contacts 47 are connected in series with normally closed contacts J and normally open contacts H and 8 and logic relay 51. The contacts H are closed by the advancement of the locator mechanism 57 while the contacts 8 are closed by the energization of the solenoid operated valve 75. Accordingly, the logic relay 51 will be energized by the failure of the operation of the clamps close limit switch 77 to produce the logic input signal J and therefore the logic relay 51 will produce the logic output signal 51 to energize the associated fault light 51. Another set of associated contacts 47 are connected in series with normally closed contacts K and normally open contacts J and 10 and logic relay 52. The contacts J are closed by the operation of the clamps close limit switch 77 and the contacts 10 are closed by the operation of the logic relay 10 to energize the solenoid operated valve 87. Accordingly, the failure of the operation of the limit switch 89 by the closing of the clamps will cause the energization of the logic relay 52 to thereby produce the logic output signal 52 which energizes the corresponding failure light 52. Still another set of contacts 47 are connected in series with normally closed contacts 4, M, H, and normally open contacts K and logic relay 53. The normally open contacts K are closed by the operation of the limit switch 89 indicating that the latches are in, as discussed above. Accordingly, the failure of the operation of the limit switch 91 will enable the logic relay 53 to be energized producing a logic output signal 53 to energize the associated fault light 53 to signal that the positioner mechanism 45 failed to retract. Still another set of contacts 47 are serially connected with normally open contacts 27, normally closed contacts N and logic relay 54. The contacts 27 are closed by the energization of logic relay 27 as a result of the closing of the engager pressure switch 43 producing logic input signal F. Accordingly, the logic relay 54 will be energized to produce a logic output signal 54 which effects the energization of the associated fault detector light 54 unless the limit switch 115 is closed to produce the logic input signal N upon the movement of the wheel base 17 to the retracted position. Similarly, another set of contacts 47 are serially connected with normally open contacts J, K, 12, normally closed contacts L, and logic relay 55. The contacts J are closed by the operation of the limit switch 77 producing logic input signal J and the normally open contacts K are closed by the operation of the limit switch 89 producing the logic input signal K and normally open contacts 12 are closed by the energization of logic relay 12 which energizes motor relay MR to drive the headstocks 23L, 23R. Accordingly, unless the plugging switch 99 is operated to produce logic input signal L to open the normally closed contacts L the logic relay 55 energizes an associated light 55 indicating the fault of the operation of the switch 99. Finally, another set of contacts 47 are connected in series with normally open contacts 15 and normally closed contacts N and a logic relay 57. The normally open contacts are closed by the energization of the logic relay 15 which energizes the rapid feed valve 111 and the logic relay 57 will be energized by the failure of the operation of the limit switch 115 so as to produce the logic input signal N. Accordingly, the logic relay 57 will produce logic output signal 57 to effect the energization of an associated light 57.

The energization of any of the logic relays 48–57 closes associated contacts 48–57 to energize serially connected relays 58 which in turn closes associated contacts 58 to energize logic relay 38' which in turn effects the energization of the logic relay 56 as previously described to produce a logic output signal 56 energizing the general fault light 56. With the energization of the logic relay 56, the normally closed contacts 56 throughout the logic circuitry of the sequence controller 135 are opened to prevent further operation of the grinding machine in the automatic mode. Accordingly, with the energization of the particular fault light, as discussed above, an operator may manually operate the switch to determine whether the switch itself is defective or whether the movement of one of the machine mechanisms failed to operate the switch as a result of misalignment or some other problem, such as another switch in the sequence connected to enable the operation of the particular switch indicated by the fault detector. By manually operating the switches associated with the fault detector light, the operator can determine the defective switch or the cause of the fault by observing the deenergization of the particular fault light. Nevertheless, the grinding machine 11 will not continue with its grinding operation due to the energization of the logic relay 56 which disables normally closed contacts throughout the logic circuitry of the sequence controller 135.

Having corrected the sequential fault disabling the grinding machine, the operator may again start the machine by depressing the CYCLE STOP push button switch 215 to produce the logic input signal E, thereby opening the normally closed contacts E connected in series with the logic relay 56, thereby removing the logic output signal 56 and deenergizing the general fault light 56. Next, the machine must be moved to the initial position by the operation of the switches on the control panel 125 which are operated during a manual mode of operation. To change from automatic operation to manual operation, the RESET pushbutton switch 207 must be depressed to produce logic input signal B, thereby opening the normally closed contacts B to deenergize the logic relay 25 to disable the automatic operation as previously described. Next, the manual select switch 209 may be depressed to effect the energization of the controls for the manual mode operation, as previously described, and the various pushbutton and selector switches in the manual mode of operation may be depressed to move the mechanisms of the machine to the initial position as discussed above. Subsequently, the automatic operation of the machine may be initiated in the manner described above by first depressing the RESET pushbutton switch 207, the AUTOMATIC SELECT pushbutton switch 211, and then depressing the CYCLE START pushbutton switch 215.

If the grinding machine successfully completes the first event, as described above, the operation of the limit switch 116 upon movement of the wheel base 17 to the forward position produces a logic input signal N which resets the first event timer 47. At the same time, the logic input signal N closes corresponding contacts N connected in series with the now closed contacts 26 and P which are closed by the operation of the limit switch 183 to energize a serially connected logic relay 59 which closes associated holding contacts connected in parallel with the contacts 26 and N and at the same time closes associated contacts 59 connected in series with normally closed contacts O to initiate the operation of the timer 60 for timing the period of the second event. The second event proceeds as discussed above with the grinding of the crankpin to a desired size as indicated by the gage. During the grinding operation, the positioner mechanism 45 and work rest mechanism 147 are moved as previously discussed. If the grinding machine completes the second event successfully, as indicated by the operation of the limit switch 159 the the wheel base at the retracted position to produce logic input signal O, the normally closed contacts O are opened to reset the timer 60. Alternatively, if the second event is not successfully completed, as indicated by the failure of the operation of the limit switch 159 to produce the logic input signal O, then the timer 60 completes its predetermined period of operation and energizes logic relay 60 which closes associated contacts 60 serially connected with other logic relay to provide a visual indication of the sequential fault disabling the grinding machine during the second event as well as effecting the energization of the logic relay 56 which disables the machine from further operation and effects the energization of the general fault light 56 in the manner previously described.

The energization of the logic relay 60 closes associated contacts 60 connected in series with normally closed contacts G and now closed contacts 4 and J and logic relay 61. If the limit switch 55 fails to operate so as to produce logic input signals G, then the logic relay 61 is energized to produce logic output signals 61 to energize an associated sequential fault indicator light 61. Another set of contacts 60 are connected in series with normally opened contacts 401 and G and normally closed contacts T and logic relay 62. The contacts 401 are closed by a signal from the comparator circuit 143 and the contacts G are closed by the operation of the limit switch 55 to produce the logic input signals G. Accordingly, the failure of the movement of the work rest to operate limit switch 199 to produce logic input signals T to open the normally closed contacts T will effect the energization of the relay 62 to produce logic output signals 62 which energize an associated sequence fault indicator light 62. Another set of contacts 60 are connected in series with normally closed contacts 4 and 61 and M and logic relay 63. Accordingly, the failure of the positioner to operate the limit switch 91 at the lowered rest position to produce the logic input signals M and open the normally closed contacts M will effect the energization of the logic relay 63 which produces logic output signals 63 to energize an associated sequential fault indicator light 63. Another set of contacts 60 are connected in series with normally closed contacts T, 403, 62 and logic relay 64. Accordingly, the failure of the operation of the limit switch 199 to produce logic input signals T to open the normally closed contacts T will effect the energization of logic relay 64 which produces logic output signals 64 to energize the associated sequential fault indicator light 64. Finally, a set of contacts 60 are connected in series with normally closed contacts 15 and O and logic relay 65, and the failure of the operation of limit switch 159 to produce logic input signals O will effect the energization of logic relay 65 to produce logic output signals 65 so as to energize the sequential fault indicator light 65. The energization of any of the logic relays 61–65 will close associated parallel connected contacts 61–65 to energize a serially connected logic relay 66 which in turn will close associated contacts 66 to energize serially connected logic relay 38' which causes the energization of the logic relay 56 and the general fault indicator light 56 in the manner discussed above. As previously discussed, the particular fault disabling the operation of the machine may be detected by manually operating the switches involved until the particular sequential fault indicator light is deenergized. The further operation of the machine is disabled by the operation of the general fault signal caused by the energization of the logic relay 56. Accordingly, in the manner described above, in connection with the first event, the grinding machine must be returned to the initial position through the operation of the controls associated with the manual mode requiring the depression of the CYCLE STOP pushbutton 215 to remove the general fault indicator light 56, and then the depression of the RESET pushbutton switch 207, the MANUAL SELECT switch 209 followed by the operation of the necessary manual mode controls. Finally, the operation of the machine must be started again by depressing the RESET pushbutton switch 207, the AUTOMATIC SELECT pushbutton switch 211 and CYCLE START pushbutton switch 213.

After the second event, as discussed above, the next crankpin of the crankshaft is indexed for a grinding operation by traversing the workpiece carriage 13 to bring the next pin into general alignment with the grinding wheel 15 and by rotary indexing the crankshaft to align the next succeeding crankpin with the axis of rotation of the rotatably driven headstocks 23L, 23R. When the second event is successfully completed, as indicated by the closing of the limit switch 159 with the wheel base 117 in the retracted position so as to produce logic input signal O, corresponding contacts O are closed in series with now closed normally open contacts 26, L, M, and normally closed contacts Q to energize logic relay 67 which closes associated contacts 67 to energize logic relay 68 which closes holding contacts 68 in series with normally closed contacts P and at the same time closes contacts 68 serially connected with the timer 69 so as to commence the timing of the third event. If the third event is not successively completed, then the timer 69 will complete its period of operation, thereby energizing logic relay 69 to close associated contacts 69 and effect the energization of sequential fault indicator lights as explained below. As shown, contacts 69 are connected in series with normally open contacts 18 and normally closed contacts P. The contacts 18 are closed by the operation of logic relay 18 as previously discussed in connection with the traversing of workpiece carriage 13 and the logic relay 70 will be energized by the failure of the plunger 169 to enter a notch 171 to operate the limit switch 183 to produce the logic input signal P to open the normally closed contacts P. Accordingly, the energization of the logic relay 70 will effect the logic output signals 70 to energize an associated sequence fault indicator light 70. Another set of contacts 69 are connected in series with normally open contacts 18 and normally closed contacts "index match" and logic relay 71. Contacts 18 are closed as mentioned above and the failure of an "index match" signal resulting from the failure of a rotary indexing limit switch, not described, will energize logic relay 71 to produce logic output signal 71 to energize the sequential fault indicator light 71. Another set of contacts 69 are connected in series with normally open contacts 19 and normally closed contacts "index match" and logic relay 72. Contacts 19 are closed by the operation of logic relay 19 in a manner previously described, and the failure of the workpiece carriage to traverse, as indicated by the lack of an "index match" signal will effect the energization of logic relay 72 to produce logic output signal 72 energizing the associated sequential fault indicator light 72.

As previously described in connection with the first and second events, the energization of a logic relay effecting the energization of a sequence fault indicator light 70–72 will close associated parallel connected contacts 70, 71 and 72 to energize serially connected logic relay 73 which closes associated contacts 73 to energize serially connected logic relay 38' which effects the energization of logic relay 56 in a manner described above to energize the general fault indicator light 56 and disable the machine from further operation. Accordingly, in a manner similar to that described above, the switch causing the sequential failure may be detected and corrected to deenergize the sequential fault indicator light and the grinding machine 11 must be returned to the initial position before commencing the automatic operation again. As previously described, the general fault signal may be deenergized by depressing the CYCLE STOP push button switch 215 and the machine returned to the initial position by depressing the RESET push button switch 207 to disable the automatic controls and depressing the MANUAL SELECT push button switch 209 to return the machine to the control of the operator. The machine may then be returned to the initial position and the automatic operation by depressing the RESET push button switch 207, the AUTOMATIC SELECT push button switch 211 and the CYCLE START push button switch 203.

When the grinding machine has ground the last crankpin, with the workpiece carriage in a position closing the limit switch 193 to produce logic input signals Q, the grinding machine may be returned to the initial condition during the sequence of movements of the fourth event. As in the case of the third event, the fourth event is initiated by the return of the wheel base 17 to the retracted position with the limit switch 159 closed to produce logic input signals O. Accordingly, as shown in FIG. 9, the logic relay 74 is energized through the serially connected and now closed contacts 26, O, L, M, and Q so as to close associated contacts 74 energizing serially connected logic relays 75 which closes associated holding contacts 75 connected in series with normally closed contacts P and R. At the same time, the energization of logic relay 75 closes associated contacts 75 to initiate the operation of timer 76 for timing the movements of the fourth event. If the grinding machine fails to successfully complete the fourth event due to a sequential failure, then the timer 76 will complete its period of operation and energize logic relay 76, thereby closing associated contacts to energize other logic relays and provide both a general fault signal and a sequential fault signal indicative of the disablement of the machine.

Accordingly, the energization of logic relay 76 closes associated contacts 76 connected in series with normally open contacts 18 and P and logic relay 77. If the carriage index plunger 169 is not received in a notch 171 so as to close limit switch 183 to produce logic input signals P, then logic relay 77 will be energized to produce logic output signals 77 to energize an associated sequential fault indicator light 77. Another set of contacts 76 are connected in series with contacts 18 which are closed as mentioned above and normally closed contacts "index match" and logic relay 79. If an "index match" signal is not present as the result of a failure of the rotary indexing mechanism so as to open the normally closed "index match" contacts then logic relay 78 is energized to produce logic output signals 78 to energize a corresponding sequential fault indicator light 78. Still another set of contacts 76 are connected in series with normally open contacts 20 and parallel connected normally closed contacts "index match" and R, and serially connected logic relay 79. The contacts 20 are closed by the operation of logic relay 20 as previously discussed in connection with the carriage return movement, so that the logic relay 79 will be energized unless an "index match" signal is present to open the normally closed contacts "index match" and unless the normally closed contacts R are opened by the closing of limit switch 195 at the initial position so as to produce logic input signals R. If the logic relay 79 is energized, then logic output signals 79 will be produced to energize to associated sequential fault indicator light 79. If any of the logic relays 77–79 are energized, then associated parallel connected contacts 77–79 will be closed to energize serially connected logic relay 80 which closes associated contacts 80 to energize logic relay 38' which effects the energization of logic relay 56 in the manner described above. The energization of logic relay 56 energizes the general fault indicator light 56 and disables ther further operation of the automatic circuit by opening normally closed contacts 56 throughout the logic circuitry of the sequence controller 135.

As discussed above, the sequential fault disabling the operation of the machine may be determined by operating the sequential limit switches until the sequential fault indicator light is deenergized. After the particular fault has been corrected, the automatic operation of the machine may be restored by again returning the grinding machine to the initial position in the manner described in connection with the preceding events.

If the automatic operation of the grinding machine is interrupted by a fault after one or more crankpins have been successfully ground, then, after correcting the fault and returning the machine to the initial position to restore the automatic mode of operation described above, the previously ground crankpins may be by-passed during the subsequent automatic operation by depressing a suitable INDEX pushbutton switch 200 on the control panel 125 as the wheelbase 17 moves from the retracted position to the forward position. As shown in FIG. 7, the depression of the INDEX pushbutton switch 200 produces a logic input signal V which opens suitable corresponding normally closed contacts V in the logic circuitry of the sequence controller 135 as shown in FIG. 9. The logic input signals V serve the same function as the logic input signal 403 which is produced in response to a signal from the comparator circuit 143 when a crankpin is ground to a desired size as sensed by the gage. Accordingly, the wheelbase 17 will be returned to the retracted position and the next succeeding crankpin will be indexed for a grinding operation.

What is claimed is:

1. In a grinding machine, the combination comprising:
   a workpiece carriage for supporting a workpiece to be ground during a grinding operation,
   said workpiece carriage having first and second headstocks for being rotatably driven during a grinding operation,
   said first and second headstocks each having a clamping mechanism for receiving a workpiece to be ground and being operable in response to an actuating signal for gripping the workpiece, a rotary indexing mechanism associated with said first headstock for normally positioning a first crankpin to be ground in coaxial alignment with the axis of rotation of said first and second headstocks and being operable in response to successive actuating signals for rotatably indexing successive crankpins of the crankshaft with the axis of rotation of said first and second headstocks, an engager mechanism associated with said second headstock and being operable in response to an actuating signal for pressing against one end of the crankshaft received in the positioning mechanism associated with said second headstock to press the opposite end of the crankshaft received in the positioning mechanism of said first headstock into cooperative indexing association with said rotary indexing mechanism, control means for controlling the operation of the grinding machine and being operable in response to a starting signal for supplying an actuating signal to said engager mechanism, a positioner mechanism supported for movement between a lowered rest position and a raised operating position and being operable in response to an actuating signal for movement to the raised operating position, said control means being operable in response to the movement of said engager mechanism for supplying an actuating signal to said positioner mechanism for moving it to the raised position, an axial locating mechanism carried by said positioner mechanism and operable in response to an actuating signal for axially aligning the crankpin to be ground, said control means including means for sensing the movement of said positioner mechanism and being operable in response to the movement of said positioner mechanism to the raised position for supplying an actuating signal to said axial locating mechanism to axially position the crankpin for grinding, said control means including sensing means for sensing the completion of the operation of said axial positioning mechanism and said control means being operable in response to the completion of the operation of said axial locating mechanism for supplying an actuating signal to said clamping mechanism associated with said first and second headstocks to close the clamping mechanisms about the axially aligned crankshaft, a latching mechanism associated with said first and second headstocks and operable in response to an actuating signal for latching the clamping mechanism in a closed condition, said control means being operable in response to the closing of said clamping mechanisms for supplying an actuating signal to said latching mechanism to latch said clamping mechanisms in the closed position, said control means including sensing means for sensing the operation of said latching mechanism and said control means being operable in response to the operation of said latching mechanism for removing the actuating signal from said axial located mechanism and said positioner mechanism so as to retract said axial locating mechanism and lower said positioner mechanism to the rest position, said control means being operable in response to the operation of said latching mechanism for effecting the rotatable drive of said first and second headstocks, a grinding wheel rotatably carried by a wheel base slidably supported for movement to and from said workpiece carriage, rapid feed means operable in response to forward actuating signal for moving the wheel base from a retracted position to a forward position, said control means including means for sensing the rotation of said first and second headstocks at a predetermined speed and being operable in response to said headstocks reaching the predetermined rotational speed for supplying a forward actuating signal to said rapid feed means to move said grinding wheel base to the forward position, an electrical feed arrangement for advancing said grinding wheel against the rotating workpiece, said control means being operable in response to the movement of said grinding wheel base to the forward position for initiating the operation of said electrical feed arrangement to grind the workpiece in a preliminary grinding operation, said control means being operable in response to the completion of the preliminary grinding operation for supplying an actuating signal to said positioner mechanism to move it to the raised operating position, gage means carried by said positioner mechanism for sensing the actual size of the workpiece upon movement of said positioner mechanism to the raised operating position, a work rest mechanism carried by said positioner mechanism and being operable in response to an actuating signal for movement against the workpiece, said control means being operable in response to the movement of said positioner mechanism to the raised position for supplying an actuating signal to said work rest mechanism to advance the work rest mechanism against the crankpin being ground, said control means being operable in response to the completion of the preliminary grinding operation for initiating the operation of said electrical feed arrangement to grind the workpiece to a predetermined desired size, said control means being operable in response to the workpiece being ground to the predetermined desired size as sensed by said gage means for removing the actuating signal from said work rest mechanism to retract it from the workpiece and for removing the actuating signal from said positioner mechanism to lower it from the operating position and for supplying a reverse actuating signal to said rapid feed means to move the wheel base from the forward position to the retracted position, said control means being operable in response to the movement of said wheel base to the retracted position for removing the actuating signal from said clamping mechanisms to release the workpiece for rotation movement relative to said clamping mechanisms and supplying an actuating signal to said rotary indexing mechanism for rotating the workpiece to index the next succeeding crankpin in coaxial alignment with the axis of rotation of said first and second headstocks, said workpiece carriage being slidably supported for movement transverse to the slidable movement of said grinding wheel base, moving means associated with said workpiece carriage and being operable in response to a first traverse actuating signal to traverse said workpiece carriage in a first direction to axially index the next succeeding crankpin for a grinding operation and being operable in response to a second traverse actuating signal to return said workpiece carriage in a second direction to axially index an initial crankpin for grinding, said control means being operable in response to the movement of said grinding wheel base to the retracted position for supplying a first traverse actuating signal to said moving means to position the next successive crankpin for a grinding operation, said control means including means for sensing the movement of the said workpiece carriage to axially position the next successive crankpin for a grinding operation and operating in response thereto to actuate said positioner mechanism to initiate the grinding operation of the next successive crankpin, said control means including means for sensing the traversing movement of said workpiece carriage to position the final crankpin for a grinding operation and being operable in response to the movement of said grinding wheel base to the retracted position for supplying a second traverse actuating signal to said moving means for returning said workpiece carriage to the initial position, said control means including means for sensing the return of said workpiece carriage to the initial position and being operable in response thereto for stopping the rotatable drive of said first and second headstocks and removing the actuating signal to said latching mechanism to unlatch said clamping mechanism and for removing the actuating signal from said clamping mechanism to open said clamping mechanism to enable the ground crankshaft to be replaced with an unground workpiece, said control means being adapted to operate said grinding machine in either manual or automatic modes of operation and said controls means being operable in an automatic mode only upon an initial positioning of said workpiece carriage and said positioner mechanism and said axial locating mechanism and said engager mechanism and said clamping mechanism and said latching mechanism and said first and second rotatable headstocks and said rotary indexing mechanism and said grinding wheel base, said control means including fault indicating means for sensing the initial condition of said workpiece carriage and said positioner mechanism and said axial locator mechanism and said engager mechanism and said clamping mechanism and said latching mechanism and said first and second headstocks rotatable headstocks and said rotary indexing mechanism and said grinding wheel base, and said fault indicating means being operable to provide a plurality of initial condition fault signals each associated with a different initial condition unless said initial condition is sensed by said fault indicating means.

2. In a grinding machine according to claim 1, said fault indicating means further including means operable in response to a fault signal associated with an initial condition for providing a general fault signal and disabling the operation of the grinding machine in the automatic mode until the initial condition associated with the initial condition fault signal is sensed by said fault indicating means.

3. In a grinding machine according to claim 1:

said engager mechanism and sid positioner mechanism and said axial locating mechanism and said clamping mechanism and said latching mechanism and said first and second rotatable headstocks and said rapid feed means being operated in a first predetermined sequence by said control means during an automatic mode of operation, said fault indicating means including timing means operable for a predetermined period of time in response to the initiation of said first predetermined sequence, said fault indicating means including means for sensing the completion of said first predetermined sequence and being operable in response thereto for interrupting and resetting the operation of said timing means, said fault indicating means including sensing means for sensing the sequential operation of said engager mechanism and said positioner mechanism and said axial locating mechanism and said clamping mechanism and said first and second rotatable headstocks and said rapid feed means, and said fault indicating means operable in response to the completion of said timing means for providing a plurality of sequential fault signals each associated with a different sequential condition unless the sequential condition is sensed by said sensing means, 4. In a grinding machine according to claim 3, said fault indicating means further including means operable in response to a fault signal associated with a sequential condition for providing a general fault signal and disabling the operation of the grinding machine in the automatic mode until the sequential condition associated with the sequential fault signal is sensed by said fault indicating means.

5. A machine tool comprising a plurality of selectively displaceable machine mechanisms, means for sequentially operating said plurality of selectively displaceable machine mechanisms including a corresponding plurality of means for individually displacing said plurality of machine mechanisms, means including signal generating means for selectively individually energizing said plurality of displacing means, a corresponding plurality of means for individually signaling the completion of the selective displacement of said plurality of machine mechanisms, timer means set at a predetermined time sufficient to permit completion of the operating sequence of said plurality of machine mechanisms, means for conjointly energizing said sequentially operating means and said timer means, means for resetting said timer means if the operating sequence is completed within said predetermined time, fault detection means, and means for conjointly deenergizing said sequentially operating means and for energizing said fault detection means when said timer times out, said fault detection means including a fault detection circuit associated with each of said plurality of signaling means, each of said fault detection circuits including means responsive to the presence or absence of at least one of the signals generated either by said signal generating means or said plurality of signaling means for indicating when a signal from a selected one of said plurality of signaling means should be present, means for sensing whether the signal from said one signaling means is present, a fault indicator, and means for energizing said fault indicator when said responsive means indicates that the signal from said one signaling means should be present and no signal is sensed by said sensing means.

6. A machine tool according to claim 5, wherein said fault indicator comprises a light source.

7. A machine tool according to claim 6, wherein each of said plurality of signaling means comprises a switch.

* * * * *